US011163620B2

(12) United States Patent
Liu et al.

(10) Patent No.: US 11,163,620 B2
(45) Date of Patent: Nov. 2, 2021

(54) PREDICTING API ENDPOINT DESCRIPTIONS FROM API DOCUMENTATION

(71) Applicant: FUJITSU LIMITED, Kawasaki (JP)

(72) Inventors: Lei Liu, San Jose, CA (US); Wei-Peng Chen, Fremont, CA (US); Pranav Makhijani, Bethesda, MD (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/417,262

(22) Filed: May 20, 2019

(65) Prior Publication Data
US 2020/0371851 A1 Nov. 26, 2020

(51) Int. Cl.
*G06F 9/54* (2006.01)
*G06N 20/00* (2019.01)

(52) U.S. Cl.
CPC ............ *G06F 9/547* (2013.01); *G06N 20/00* (2019.01)

(58) Field of Classification Search
CPC ................................ G06F 9/547; G06N 20/00
See application file for complete search history.

(56) References Cited

U.S. PATENT DOCUMENTS

| | | | | |
|---|---|---|---|---|
| 8,510,762 | B1 * | 8/2013 | Gregorio | G06F 8/36 717/104 |
| 10,002,129 | B1 * | 6/2018 | D'Souza | G06F 40/289 |
| 10,133,650 | B1 * | 11/2018 | Park | G06F 11/3608 |
| 10,431,210 | B1 * | 10/2019 | Huang | G06F 40/20 |
| 11,036,564 | B2 * | 6/2021 | Yoshimura | G06F 9/54 |
| 2013/0073388 | A1 * | 3/2013 | Heath | G06Q 30/02 705/14.53 |
| 2014/0208296 | A1 * | 7/2014 | Dang | G06F 8/751 717/123 |
| 2015/0379429 | A1 * | 12/2015 | Lee | G09B 5/00 706/11 |
| 2017/0091320 | A1 * | 3/2017 | Psota | G06F 16/334 |
| 2017/0316314 | A1 * | 11/2017 | Mengle | G06F 40/284 |

(Continued)

OTHER PUBLICATIONS

Lu, "Efficient and Effective Retrieval Using Higher-Order Proximity Model", pp. 1-180 (Year: 2018).*

(Continued)

*Primary Examiner* — Doon Y Chow
*Assistant Examiner* — Phuong N Hoang
(74) *Attorney, Agent, or Firm* — Fujitsu Patent Center

(57) ABSTRACT

A method includes extracting, from a labelled repository, a plurality of true endpoint descriptions associated with a plurality of web APIs and retrieving a documentation corpus associated with the plurality of web APIs. The method further includes determining a plurality of false endpoint descriptions associated with the plurality of web APIs based on the retrieved documentation corpus and the extracted plurality of true endpoint descriptions. The method further includes extracting feature information associated with the plurality of web APIs, generating a training dataset based on the extracted feature information, and obtaining a ML model based on the generated training dataset. The method further includes providing a set of inputs to the ML model and classifying the provided set of inputs as one of a true description or a false description associated with an endpoint based on a prediction result of the ML model for the provided set of inputs.

19 Claims, 11 Drawing Sheets

(56) References Cited

U.S. PATENT DOCUMENTS

2018/0165135 A1    6/2018   Bahrami et al.
2018/0196643 A1*  7/2018   Dolby .................... G06F 8/36
2019/0138901 A1*  5/2019   Meyer ................. G06N 3/0454
2019/0370323 A1* 12/2019  Davidson ........... G06F 16/3347

OTHER PUBLICATIONS

Silva, "Grammatical Error Correction System with Deep Learning", pp. 1-33, (Year: 2018).*
Silva, Grammatical Error Correction System with Deep Learnings, pp. 1-32 (Year: 2018).*

* cited by examiner

US 11,163,620 B2

PREDICTING API ENDPOINT DESCRIPTIONS FROM API DOCUMENTATION

FIELD

The embodiments discussed in the present disclosure are related to predicting application programming interface (API) endpoint descriptions from API documentation.

BACKGROUND

Many companies and organizations offer a web API infrastructure that offers different web APIs for several applications, such as speech processing and social media analysis, to third party developers and/or third party organizations. Typically, web APIs are programmatic interfaces with publicly exposed endpoints, which specify where resources can be accessed by a third party software. The details regarding usage of the web APIs and associated example codes are usually provided in web API documentations. Typically, in a Web API documentation, the endpoint description is usually surrounding endpoint names; however, there is no standard template for the web API documentation and the quality of API documentation varies a lot. In some well-structured API documentations, the endpoint descriptions are easily to find, whereas, in certain less structured API documentations, the endpoint descriptions are hard to find. As an example, in many API documentations, there is no particular pattern regarding a sentence span between endpoint name and correct endpoint description. Thus, with rapid growth of APIs, there is a long felt need to provide an automatic approach which can predict the correct endpoint description from web API documentations, including either well-structured API documentations or less structured API documentations.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include extracting, from a labelled repository, a plurality of true endpoint descriptions associated with a plurality of web Application Programming Interfaces (APIs) and retrieving a documentation corpus associated with the plurality of web APIs. The operations may further include determining a plurality of false endpoint descriptions associated with the plurality of web APIs based on the retrieved documentation corpus and the extracted plurality of true endpoint descriptions. The operations may further include extracting feature information corresponding to a plurality of features associated with the plurality of web APIs based on the extracted plurality of true endpoint descriptions, the retrieved documentation corpus, and the determined plurality of false endpoint descriptions. The operations may further include generating a training dataset based on the extracted feature information and obtaining a machine learning (ML) model based on the generated training dataset. Further, the operations may include providing a set of inputs to the ML model and classifying the provided set of inputs as one of a true description or a false description associated with the endpoint based on a prediction result of the ML model for the provided set of inputs. The set of inputs may be associated with an endpoint for a specific web API of the plurality of web APIs.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
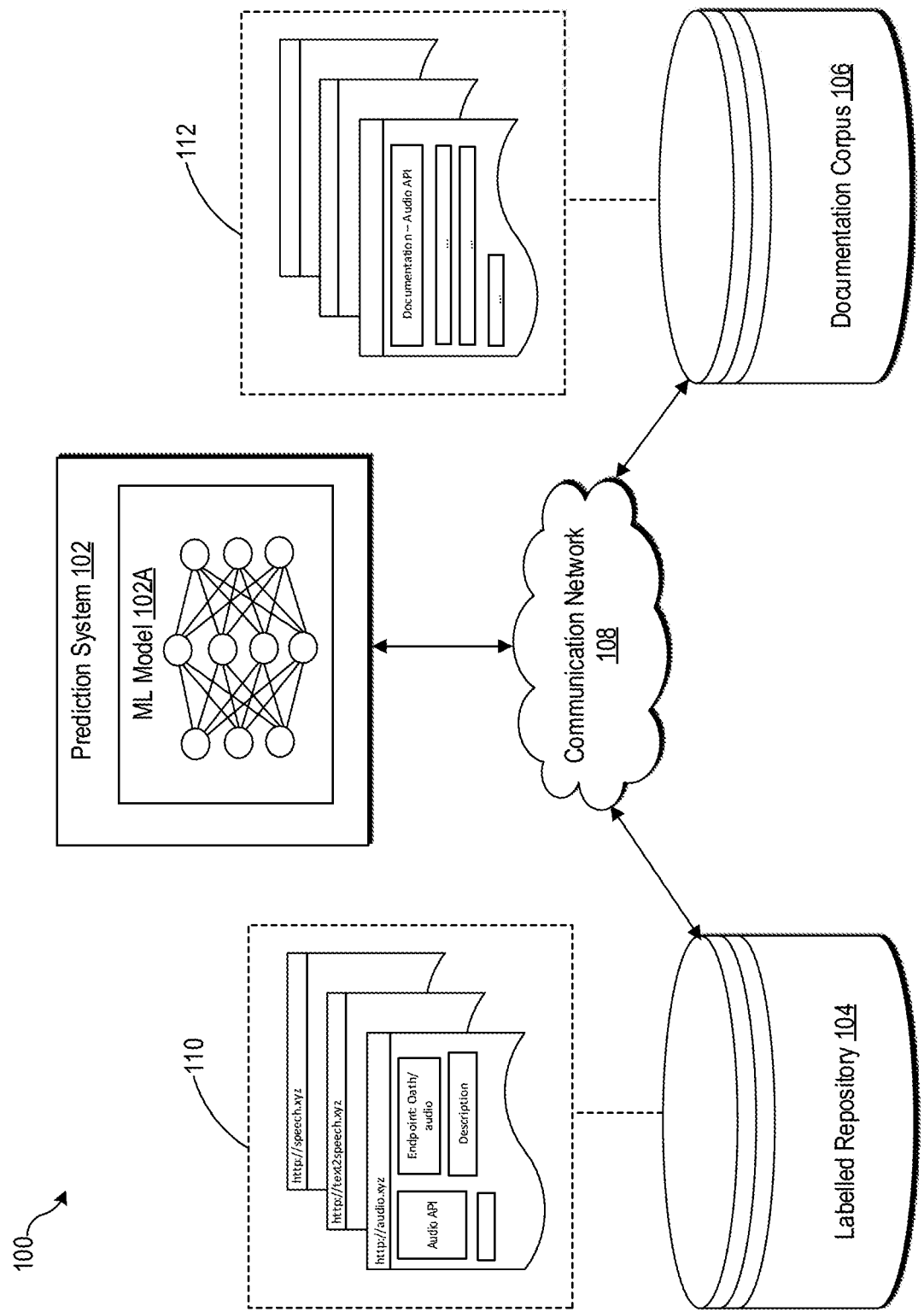
FIG. 1 is a diagram representing an example environment related to predicting API endpoint descriptions from API documentation.

Embodiments of the present disclosure are explained with reference to the accompanying drawings.

Some embodiments described in the present disclosure relate to a method and a non-transitory computer-readable medium for predicting application programming interface (API) endpoint descriptions from API documentations. The present disclosure relates to the use of a prediction system to extract true endpoint descriptions associated with a plurality of web APIs from a labelled repository and to determine false endpoint descriptions from a documentation corpus, including documents association with the plurality of web APIs. Further, the present disclosure relates to the use of the prediction system to generate a training dataset including feature information corresponding to a plurality of features associated with the plurality of web APIs and to obtain a machine learning (ML) model based on the training dataset. Further, the present disclosure relates to the use of the prediction system to output, using the ML model, a prediction result indicating whether a given endpoint description is a true description or a false description.

According to one or more embodiments of the present disclosure, the technological field of web/software application development and deep learning may be improved by providing the ML model (i.e. a trained ML model) on the prediction system in a manner in which the prediction system is able to output prediction result to indicate whether a given endpoint description of a web API's endpoint in a document is a true description or a false description. The prediction result helps the prediction system to decide whether to extract the given endpoint description directly from the document in the documentation corpus. Moreover, the ML model may be further trained to classify other information in the document to be true or false, which may further help the prediction system to decide whether to extract other information, such as input parameter descriptions or output parameter descriptions, from documents in the documentation corpus.

According to one or more embodiments of the disclosure, the ML model may be a deep learning model based on a hybrid architecture of deep neural networks (DNNs) and artificial neural networks (ANNs). Throughout this disclosure, ANN is used to present a neural network with one or more Dense layers and optional Dropout and Batch Normalization layers, and use DNN to present other neural networks, such as convolutional neural networks (CNNs), recurrent neural networks (RNNs), long short-term memory (LSTMs), etc. Due to the hybrid architecture, the ML model may achieve a high classification accuracy as compared to a standard learning models. As per experimental data, classification accuracies of "~90.31%" and "~98.13%" are achieved using convolutional neural networks (CNNs) as the DNNs and long short-term memory (LSTMs) as the DNNs, respectively.

The ability to reliably and efficiently classify a given endpoint description in a document as one of a true description or a false description may provide a number of benefits to the operation of a computer itself, and improvements to the related field of computer programming. With respect to the computer itself, the use of a trained ML model to identify which description in a document is a correct endpoint description and extraction of such correct endpoint description for a user (for example, a developer) may provide the computer with improved functionality. This improved functionality may allow the computer to invoke and/or implement new functionality that has not existed before, and generate such functionality in an automated manner. For example, the present disclosure may facilitate classification of a given endpoint description in a document as one of a true description or a false description so as to enable a user, such as a developer, to incorporate the functionality of an appropriate web API and endpoint in desired software applications.

With respect to improving computer programming, the present disclosure may provide enhanced capabilities for software development. For example, the present disclosure may provide relevant prediction results indicating relevant endpoint descriptions for web APIs which may help the user to decide whether endpoint is relevant to his software applications or not, and further to incorporate computer code for the desired web API in his/her software applications so as to enable software developers to more efficiently and reliably provide software solutions to their clients.

FIG. 1 is a diagram representing an example environment related to recommending web APIs and associated endpoints, arranged in accordance with at least one embodiment described in the present disclosure. With reference to FIG. 1, there is shown an example environment 100. In the example environment 100, there is shown a prediction system 102, a labelled repository 104, a documentation corpus 106, and a communication network 108. The prediction system 102, the labelled repository 104, and the documentation corpus 106 may be communicatively coupled to each other, via the communication network 108.

The prediction system 102 may include a machine learning (hereinafter, ML) model 102A. The prediction system 102 may be one or more of a software process, a set of machine-executable instructions on a computing device, or a computing system including devices, software codes, or a combinations thereof. The prediction system 102 may be configured to employ the ML model 102A to output a prediction result which may be indicative of whether a set of inputs to the ML model 102A is one of a true description or a false description associated with an endpoint of a web API. In order to employ the ML model 102A, the ML model 102A may need to be first trained on a training dataset, which may be obtained based on information that may be extracted from publicly available information accessible via an internet network or an intranet network.

The prediction system 102 may need to perform a search for the publicly available information which may include the labelled repository 104. The search may be performed on the web via the internet network or the intranet network. For example, the prediction system 102 may include a web crawler or web scraper (e.g. a crawler bot or a scraper bot) that may be configured to look for and collect the publicly available information associated with the plurality of web APIs from one or more computer-based sources storing the publicly available information on the web.

The labelled repository 104 which may include a plurality of structured specification documents 110 associated with the plurality of web APIs. Each API specification document of the plurality of structured specification documents 110 may include information mapped to a plurality of fields associated with a corresponding web API of the plurality of web APIs. The plurality of fields may include an API title field, an endpoint name field, and an endpoint description field. Additionally, in certain embodiments, the plurality of fields may include, for example, an API description field and fields for input/output parameters, a primary category, a secondary category, and one or more tags.

In one or more embodiments, the prediction system 102 may be configured to identify (or mark) a portion of the information mapped to the endpoint description field as a true endpoint description of the plurality of true endpoint descriptions. Further, the prediction system 102 may be configured to extract, from the labelled repository 104, a plurality of true endpoint descriptions associated with a plurality of web APIs. Some examples of structured specification documents based on which some true endpoint descriptions are extracted, are provided, for example, in FIGS. 4A and 4B.

The labelled repository 104 may be accessed from the one or more computer-based sources for the publicly available information associated with the plurality of web APIs. The one or more computer-based sources may include, but are not limited to, a web server, client computer, a dedicated API store, a file server storing API documentations, and an API search platform. The plurality of structured specification documents 110 in the one or more computer-based sources may be in any electronic format which may be a machine-readable and/or human readable format and may be available in any language, for example, English, Japanese, German, and the like. In one or more embodiments, at least one computer-based source may be a search platform which may enable a user to look up and find information associated a desired web API.

The prediction system 102 may be further configured to retrieve the documentation corpus 106 associated with the plurality of web APIs. In one or more embodiments, the prediction system 102 may be configured to use a web crawler or a web scraper (e.g. a crawler bot or a scraper bot) to look for and retrieve the documentation corpus 106 from the publicly available information stored on the one or more computer-based sources. The documentation corpus 106 may include a collection of documents 112 associated with a corresponding collection of web APIs. Examples of the documents may include, but are not limited to, API documentations, API specification documents, web pages on API repositories, API mash-ups, and usage guides. The collection of documents 112 in the documentation corpus 106 may have information associated with the plurality of web APIs arranged in an unstructured manner. For example, in a structured specification, an endpoint description for an endpoint name may be present in sentences surrounding the location of the endpoint name, whereas in an unstructured specification, sentences surrounding the location of the endpoint name may include information which may be a false description of the endpoint.

The prediction system 102 may be further configured to determine a plurality of false endpoint descriptions associated with the plurality of web APIs based on the retrieved documentation corpus 106 and the extracted plurality of true endpoint descriptions. The plurality of false endpoint descriptions may be determined from the documentation corpus 106 using one or more natural language processing (NLP) techniques, such as a sentence similarity methods. Details of the determination of the plurality of false endpoint descriptions are provided, for example, in FIGS. 5A, 5B, and 5C.

The prediction system 102 may be further configured to extract feature information corresponding to a plurality of features associated with the plurality of web APIs based on the extracted plurality of true endpoint descriptions, the retrieved documentation corpus 106, and the determined plurality of false endpoint descriptions. The extracted feature information may include, but are not limited to, an endpoint vector, a description vector, a Hyper-Text Transfer Protocol (HTTP) method, a cosine similarity score, a spacy similarity score, a session segment value, a description tag value, a number of tokens, and a count of endpoint names. Details of method to extract the feature information are provided, for example, in FIG. 3.

The prediction system 102 may be further configured to generate a training dataset based on the extracted feature information and obtain the ML model 102A based on the generated training dataset. The training dataset may be used to train the ML model 102A till a cost function/training error associated with the ML model 102A is minimized. The obtained ML model 102A may be a classifier which may output a prediction result (e.g., a "0" or a "1") for a set of inputs associated with an endpoint and thereby indicate whether the input corresponds to a true description or a false description.

The prediction system 102 may be further configured to provide the set of inputs to the ML model 102A. The set of inputs may be associated with an endpoint for a specific web API of the plurality of web APIs. As an example, the set of inputs may be feature information (i.e. similar to the feature information in the training dataset) for one or more sentences surrounding an endpoint name in a document (e.g., a test document/unseen/unlabeled document) present in the documentation corpus 106. The ML model 102A may be configured to output a prediction result and the prediction system 102 may be configured to classifying the provided set of inputs as one of a true description or a false description associated with the endpoint based on the prediction result of the ML model 102A for the provided set of inputs.

In one or more embodiments where the set of inputs including one or more sentences surrounding the endpoint in a document correspond to the true description (i.e. a prediction result is "1") associated with the endpoint, the prediction system 102 may be configured to extract the one or more sentences as the true description from the document and may use the extracted one or more sentences to build a structured specification or a suitable data structure, which may be used for several applications, for example, to display the true description to an application developer so as to help the application developer to make better informed decision regarding the use of the endpoint in his/her desired software application.

It should be noted here that the communication between the prediction system 102, the labelled repository 104, and the documentation corpus 106 may be performed via the communication network 108. The communication network 108 may include a communication medium through which the prediction system 102 may access the labelled repository 104 via the web and communicate with different devices (not shown). Examples of the communication network 108 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the example environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to the prediction system 102 without departing from the scope of the present disclosure. For example, the prediction system 102 may be a distributed network of servers which may collectively operate to classify a set of inputs as one of a true description or a false description associated with an endpoint for a specific web API of the plurality of web APIs.

Figure 2:
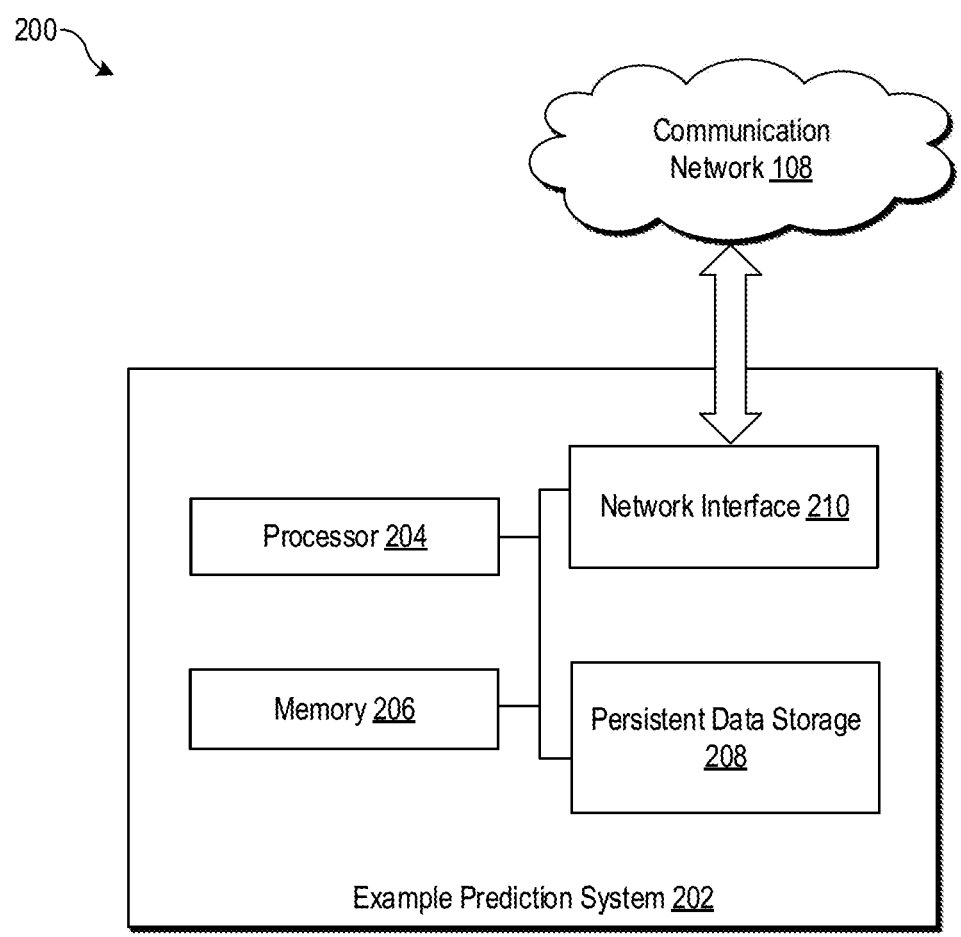
FIG. 2 is a block diagram of an example prediction system for predicting API endpoint descriptions from API documentation.

FIG. 2 is a block diagram of an example prediction system for predicting API endpoint descriptions from API documentation, arranged in accordance with at least one embodiment described in the present disclosure. FIG. 2 is explained in conjunction with elements from FIG. 1. With reference to FIG. 2, there is shown a block diagram 200 of an example prediction system 202. The example prediction system 202 may include a processor 204, a memory 206, a persistent data storage 208, and a network interface 210. The example prediction system 202 may correspond to the prediction system 102 of FIG. 1.

The processor 204 may comprise suitable logic, circuitry, and/or interfaces that may be configured to execute program instructions associated with different operations to be executed by the example prediction system 202. For example, some of the operations may include extracting plurality of true endpoint descriptions associated with web APIs from the labelled repository 104, retrieving a documentation corpus, determining a plurality of false endpoint descriptions from the retrieved documentation corpus, constructing a training dataset, obtaining the ML model 102A based on the training dataset to classify a given input as one of a true description or a false description associated with an endpoint, and the like. The processor 204 may include any suitable special-purpose or general-purpose computer, computing entity, or processing device, including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 204 may include any number of processors configured to, individually or collectively, perform or direct performance of any number of operations of the example prediction system 202, as described in the present disclosure. Additionally, one or more of the processors may be present on one or more different electronic devices, such as different servers.

In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into memory 206, the processor 204 may execute the program instructions. Some of the examples of the processor 204 may be a GPU, a CPU, a RISC processor, an ASIC processor, a CISC processor, a co-processor, and/or a combination thereof.

The memory 206 may comprise suitable logic, circuitry, and/or interfaces that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204.

By way of example, and not limitation, such computer-readable storage media may include tangible or non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the example prediction system 202.

The persistent data storage 208 may comprise suitable logic, circuitry, and/or interfaces that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the example prediction system 202.

The network interface 210 may comprise suitable logic, circuitry, interfaces, and/or code that may be configured to establish a communication among the example prediction system 202 and the labelled repository 104, via the communication network 108. The network interface 210 may be implemented by use of various known technologies to support wired or wireless communication of the example prediction system 202, via the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

In certain embodiments, the example prediction system 202 may be divided into a front end subsystem and a backend subsystem. The front end subsystem may be solely configured to receive requests/instructions from one or more of third party servers, web servers, client machines, user-end devices, and the backend subsystem. These requests may be communicated back to the backend subsystem, which may be configured to act upon these requests. For example, in case the example prediction system 202 includes multiple servers, few of the servers may be front-end servers configured to relay the requests/instructions to remaining servers associated with the backend subsystem. The backend subsystem may also store the ML model 102A once trained on the training dataset. Modifications, additions, or omissions may be made to the example prediction system 202, without departing from the scope of the present disclosure.

For example, in some embodiments, the example prediction system 202 may include any number of other components that may not be explicitly illustrated or described.

Figure 3:
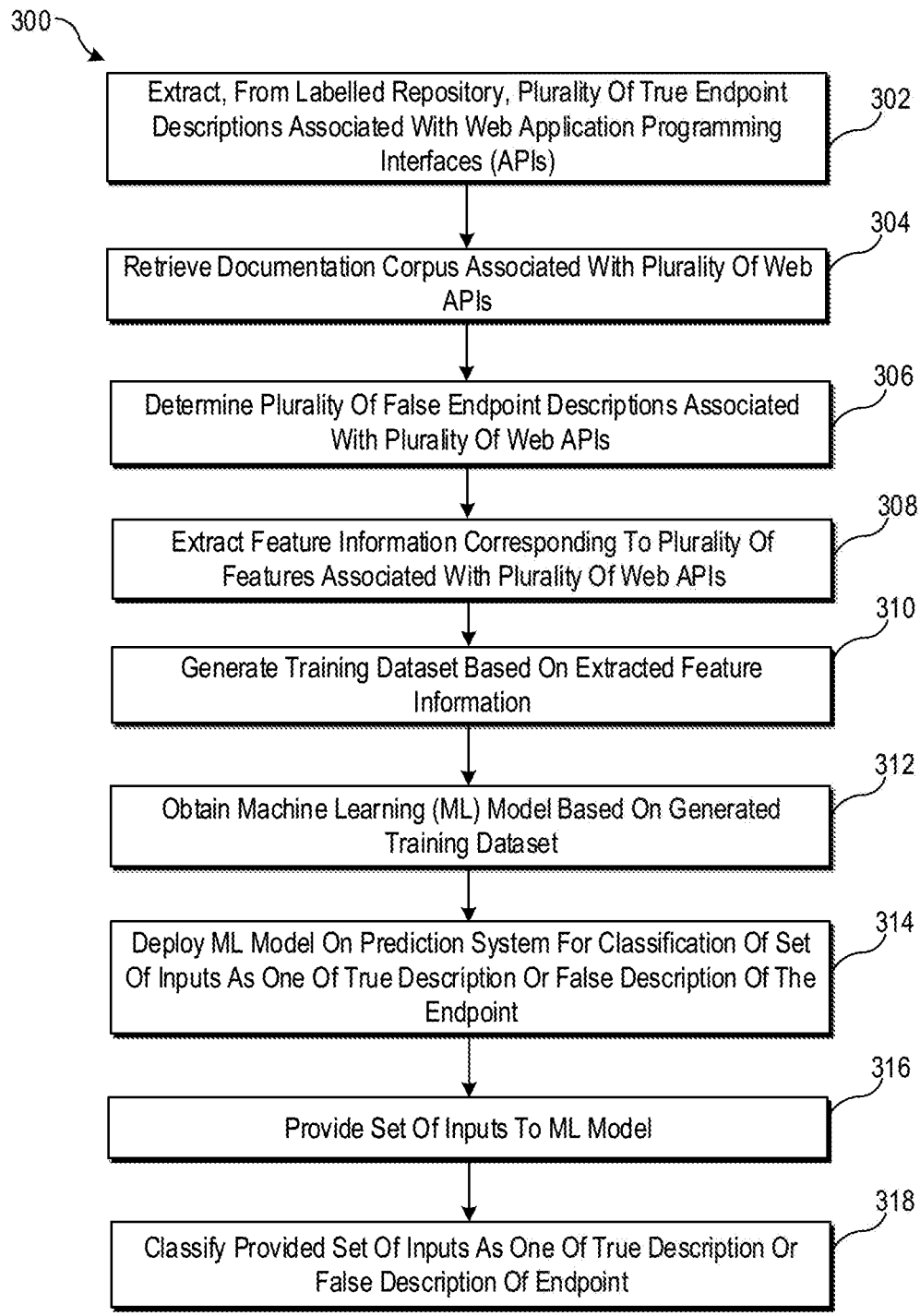
FIG. 3 illustrates a flowchart of an example method of predicting API endpoint descriptions from API documentation.

FIG. 3 illustrates a flowchart of an example method of predicting API endpoint descriptions from API documentation, according to at least one embodiment described in the present disclosure. FIG. 3 is explained in conjunction with elements from FIG. 1 and FIG. 2. With reference to FIG. 3, there is shown a flowchart 300. The method illustrated in the flowchart 300 may start at 302 and may be performed by any suitable system, apparatus, or device, such as by the example prediction system 202 of FIG. 2.

At 302, a plurality of true endpoint descriptions associated with a plurality of web APIs may be extracted from the labelled repository 104. In one or more embodiments, the processor 204 may be configured to extract the plurality of true endpoint descriptions associated with the plurality of web APIs from the labelled repository 104. The labelled repository 104 may include the plurality of structured specification documents 110 associated with the plurality of web APIs. Each structured specification document of the plurality of structured specification documents 110 may be associated with a file type. Examples of the document type may include, but is not limited to, Hyper Text Markup Language (HTML), Portable Document Format (PDF), Unicode plain text (TxT), Open XML document (DOCX), Comma Separated Values (CSV), Extensible Markup Language (XML), and Rich Text document (RTF). Further, each structured specification document may include information mapped to a plurality of fields associated with a corresponding web API of the plurality of web APIs. The information may include, but are not limited to, an API title, an endpoint name, and an endpoint description. Also, in certain embodiments, the information may include an API description, an input parameter description, an output parameter description, a primary category, a secondary category, and one or more tags. Further, a portion of the information mapped to the endpoint description field may be marked as a true endpoint description and may be further extracted from a structured specification document. Similarly, true endpoint descriptions from other structured specification documents may be identified and extracted. An example of true endpoint descriptions in example structured specification documents is provided in FIGS. 4A and 4B.

At 304, a documentation corpus 106 associated with the plurality of web APIs may be retrieved. In one or more embodiments, the processor 204 may be configured to retrieve the documentation corpus 106 from the one or more computer-based sources. The documentation corpus 106 may include the collection of documents 112 associated with a corresponding collection of web APIs. Examples of documents in the collection of documents 112 may include, but are not limited to, API documentations, API specification documents, web pages on API repositories, API mash-ups, and usage guides.

As an example, the documentation corpus 106 may correspond to a corpus of API documentations including a collections of API documents (such as html pages) from websites of API providers. The collection of documents in the documentation corpus 106 may have information associated with the plurality of web APIs arranged in an unstructured manner. For example, in a structured specification, an endpoint description for an endpoint name may be present in sentences surrounding the location of the endpoint name, whereas in an unstructured specification, some of the sentences surrounding the location of the endpoint name may include a false description of the endpoint.

At 306, a plurality of false endpoint descriptions associated with the plurality of web APIs may be determined based on the retrieved documentation corpus 106 and the extracted plurality of true endpoint descriptions. In general, a false endpoint description may correspond to a sentence (or set of sentences) which is semantically and/or contextually different from that of a true endpoint description for a given endpoint. In one or more embodiments, the processor 204 may be configured to determine the plurality of false endpoint descriptions associated with the plurality of web APIs based on the retrieved documentation corpus 106 and the extracted plurality of true endpoint descriptions. In order to determine the plurality of false endpoint descriptions, each document of the plurality of documents in the documentation corpus 106 which is associated with a web API may be parsed and specific text portion surrounding the endpoint name(s) in the document may be collected. Further, one or more natural language processing operations may be executed, such as sentence similarity operations between collected specific text portion and the true endpoint description for the corresponding web API. Sentences in the collected specific text portion having lower sentence similarity may be identified as a false endpoint description for the corresponding web API. The details of the process of determination of the plurality of false endpoint descriptions are provided, for example, in FIGS. 5A, 5B, and 5C.

In certain embodiments, the processor 204 may be configured to construct an initial dataset associated with the plurality of web APIs. The initial dataset may be constructed based on the extracted plurality of true endpoint descriptions, the retrieved documentation corpus 106, and the determined plurality of false endpoint descriptions. The initial dataset may correspond to a database table having a plurality of categorical variables and a binary variable (i.e. an output label for training the ML model 102A). The plurality of categorical variables may include, but are not limited to, an API name, an endpoint name, and an endpoint description. Similarly, the binary variable may be indicative of whether the endpoint description is a true description of the endpoint name. The initial dataset may be built so as to extract different features for a training dataset which would be used for training the ML model 102A.

As an example, an example dataset with True and False endpoint descriptions is provided in Table 1, with the number of True and False endpoint descriptions assumed to be similar. Table 1 is given as follows:

TABLE 1

Example Initial Dataset

| API | Endpoint | Description | IsDescription |
|---|---|---|---|
| DropB | /albums | Get several albums | 1 (True) |
| DropB | /albums | The code acquired by directing users | 0 (False) |
| ... | ... | ... | ... |

At 308, feature information corresponding to a plurality of features associated with the plurality of web APIs may be extracted based on the extracted plurality of true endpoint descriptions, the retrieved documentation corpus 106, and the determined plurality of false endpoint descriptions. In certain embodiments, the feature information corresponding to the plurality of features associated with the plurality of web APIs may be extracted based on the constructed initial dataset.

In one or more embodiments, the processor 204 may be configured to extract the feature information corresponding to the plurality of features associated with the plurality of web APIs. The plurality of features may include, but are not limited to, an endpoint vector feature, a description vector feature, an HTTP method feature, a cosine similarity feature, a spacy similarity feature, a session segment feature, a description tag feature, a number of tokens feature, or a count of endpoint names feature.

In an embodiment, an endpoint vector of each endpoint name in the constructed initial dataset may be computed. The endpoint vector may be computed as a word vector representation (i.e. a word embedding) of a corresponding endpoint name in the constructed initial dataset. The endpoint vector may capture syntactic and semantic relationships across a set of words in the endpoint name. More specifically, the endpoint vector would represent words in the endpoint name as multidimensional continuous floating point numbers where semantically similar words are mapped to proximate points in a geometric space. Alternatively stated, the endpoint vector may be represented as a row of real valued numbers where each point may capture a dimension of word's meaning and where semantically similar words may have similar word vectors. For example, word vectors for "tire" and "wheel" should be similar to that for "vehicle". Further, a description vector of each endpoint description in the constructed initial dataset may be computed. Similar to the endpoint vector, the description vector may also be a word vector representation (i.e. word embedding) of the endpoint description.

In an embodiment, a cosine similarity score may be computed between each endpoint vector and the computed description vector for a corresponding endpoint description in the constructed initial dataset. Thus, the cosine similarity score may be a measure of similarity between two non-zero vectors, i.e. the endpoint vector and the description vector. The measure of similarity may be obtained from an inner product that measures the cosine of the angle between the endpoint vector and the description vector. As an example, the cosine similarity score may be a measure of relative orientation of the endpoint vector and the description vector and not magnitude. Therefore, in case the endpoint vector and the description vector have same orientation, the cosine similarity score may be "1". Whereas if the endpoint vector and the description vector are oriented at "90°" relative to each other, the cosine similarity score may be "0". Further, in an embodiments, a spacy similarity score may be computed between each endpoint name in the constructed initial dataset and the corresponding endpoint description. Similar to cosine similarity score, the spacy similarity score may provide a measure of similarity over an average of word vectors (e.g., obtained using Global vectors for word representation's (GloVe's) word2vec model). In certain cases, the spacy similarity score may be computed as zero ("0") when unseen/unclean text is present in either of the endpoint name or the corresponding endpoint description in the constructed initial dataset.

In an embodiment, a presence of an HTTP method for a corresponding endpoint name may be determined in the retrieved documentation corpus 106. Further, the HTTP method for the corresponding endpoint name may be identified based on the determination that the HTTP method is present for the corresponding endpoint name in the retrieved documentation corpus 106. Also, the HTTP method may be set as "NONE" for the corresponding endpoint name based on the determination that the HTTP method is absent for the corresponding endpoint name in the retrieved documentation corpus 106. Instead of using the HTTP method as a binary variable, it may be considered as a categorical variable, for example, with, "7" different categories. As an example, the HTTP method may be one of GET, POST, PUT, PATCH, DELETE, OPTIONS, or HEAD.

In an embodiment, a presence of one or more sentences of a corresponding endpoint description for a corresponding endpoint name from the retrieved documentation corpus 106 may be determined to be in a same session as that of the corresponding endpoint name. Further, based on the determination that the one or more sentences are present in the same session as that of the corresponding endpoint name, a session segment value may be set as one ("1"). Whereas, the session segment value may be set as zero ("0") based on the determination that the one or more sentences are absent in the same session as that of the corresponding endpoint name.

In an embodiment, a presence of an endpoint description tag for a corresponding endpoint name may be determined in the retrieved documentation corpus 106. Further, based on the determination that the endpoint description tag is absent for the corresponding endpoint name in the retrieved documentation corpus 106, the description tag value may be set as zero for the corresponding endpoint name. Whereas, a word-vector representation of the endpoint description tag may be generated based on the determination that the endpoint description tag is present for the corresponding endpoint name in the retrieved documentation corpus 106. In certain scenarios, instead of merely looking up for the word "Description" in the document, the description tag feature may be extended to a more generic feature, as API documentations often include other words for HTML tags rather than the word "Description". Such HTML tags (i.e. within a range of "M" before sentences and "N" after sentences with respect to an endpoint name) may be extracted and converted into respective word vector representations, using word embedding model(s). These vector itself can be used as a feature to train the model. As an example, the word-vector representation may be obtained using GloVe's word2vec model. Thereafter, the generated word-vector representation may be set as the description tag value.

In an embodiment, a number of tokens may be estimated from a corresponding endpoint description for a corresponding endpoint name in the constructed initial dataset. The number of tokens may include a number of words and a number of special characters in the corresponding endpoint description. Further in the embodiment, a number of occurrences of the corresponding endpoint name may be estimated in the corresponding endpoint description.

In one or more embodiments, the processor 204 may be configured to: compute the endpoint vector, the description vector, the cosine similarity score, and the spacy similarity score; identify the HTTP method; determine the session segment value, the description tag value, and the number of occurrences of the endpoint name; and estimate the number of tokens.

At 310, a training dataset may be generated based on the extracted feature information. In one or more embodiments, the processor 204 may be configured to generate the training dataset based on the extracted feature information. More specifically, the training dataset may be generated based on the computed endpoint vector, the computed description vector, the computed cosine similarity score, the computer spacy similarity score, the identified HTTP method, the set session segment value, the set description tag value, the estimated number of tokens, and the determined number of occurrences of the corresponding endpoint name. An example training dataset is provided in Table 2, as follows:

TABLE 2

Example Training Dataset

| endpoint_vector | desc_vector | http path | is Des | spacy_score | token_count | ses_sg | desc tag | desc count | cos_sc |
|---|---|---|---|---|---|---|---|---|---|
| [−0.00123216, −0.00601155, −0.00917659, −0.0106832, 0.0190901, 0.0609087, 0.0233376, 0.0143696, −0.00229936, −0.00459999, −0.0522041, −0.0194006 . . . ] | [−0.00392692, −0.0322352, −0.0158399, −0.0278532, 0.0153083, 0.0552661, 0.0129537, 0.00683199, −0.000178401, 0.000132795, −0.0490766 . . . ] | GET | 1 | 0.0 | 25.0 | 1.0 | 0.0 | 0.0 | 0.97 |
| . . . | . . . | . . . | . . . | . . . | . . . | . . . | . . . | . . . | . . . |

Here, in Table 2, "endpoint_vector" corresponds to the computed endpoint vector, "desc_vector" corresponds to the computed description vector, "http path" corresponds to the identified HTTP method, "spacy_score" corresponds to the computed spacy similarity score, "token_count" corresponds to estimated number of tokens, "ses_sg" corresponds to the set session segment value, "desc tag" corresponds to the set description tag value, "desc count" corresponds to the estimated number of occurrences, and "cos_sc" corresponds to the computed cosine similarity score. Also, in Table 2, "is desc" corresponds to an output label which is "0" if corresponding endpoint description is "false" and "1" if the corresponding endpoint description is "true" and may be obtained based on the "Is Description" field in Table 1.

At 312, the ML model 102A may be obtained based on the generated training dataset. More specifically, the ML model 102A may be trained based on the extracted features information in the generated training dataset. In one or more embodiments, the processor 204 may be configured to obtain the ML model 102A based on the generated training dataset. The ML model 102a may correspond to a deep learning-based classifier which may be trained to identify a relationship between inputs, such as the feature information in the training dataset and output labels, such as "0" for false description and "1" for true descriptions. For the ML model 102A, once all the hyper-parameters are tuned and the weights are adjusted (and optimized by moving towards a global minima of a cost function for the ML model 102A) after several epochs of training on the feature information in the training dataset, the ML model 102A may be trained to output a prediction result (e.g., a "1" or a "0") for a set of inputs. The prediction result may be indicative of whether the set of inputs (e.g., input features extracted from new/unseen documents in the documentation corpus 106) to the ML model 102A corresponds to the true description or a false description associated with an endpoint.

In one or more embodiments, the ML model 102A may be a multistage neural network-based model which includes a first stage and a second stage. The first stage may include a pair of Deep Neural Networks (DNNs) arranged in parallel with an Artificial Neural Network (ANN) and the second stage may include a merge layer for merging a pair of first outputs from the pair of DNNs and a second output from the ANN. The output from the second stage may be the final output, i.e. the prediction result, of the ML model 102A. A training operation may be performed on the ML model 102A till a training error or a cost function for the ML model 102A is minimized. An example ML model which corresponds to the ML model 102A is described, for example, in FIG. 7.

At 314, the ML model 102A (i.e. a trained ML model) may be deployed on the example prediction system 202. In one or more embodiments, the processor 204 may be configured to deploy the ML model 102A on the example prediction system 202. Once deployed, the ML model 102A may be configured to receive the set of inputs associated with an endpoint for a specific web API and output the prediction result indicating whether the received set of inputs corresponds to a true description or a false description associated with the endpoint.

At 316, the set of inputs may be provided to the ML model 102A. The set of inputs may be associated with an endpoint for a specific web API of the plurality of web APIs. In one or more embodiments, the processor 204 may be configured to provide the set of inputs to the ML model 102A. For example, the set of inputs may be input features, such as the endpoint vector, the description vector, and other input features (e.g., as specified in Table 2), which may be obtained from documents which are new/unseen for the ML model 102A. In other words, the set of inputs may be derived from sentences in documents for which no output labels are specified. Whereas, each sentence in the initial dataset may be associated with an output label, such as True or False to indicate whether the corresponding sentence is a true description or a false description for an endpoint of a web API.

At 318, the provided set of inputs may be classified as one of a true description or a false description associated with the endpoint based on a prediction result of the trained ML model for the provided set of inputs. In one or more embodiments, the processor 204 may be configured to classify the provided set of inputs as one of the true description or the false description associated with the endpoint.

As an example, from a document in the documentation corpus 106, two different example sentences surrounding an endpoint name "/oauth/token" may be extracted. These two different example sentences are shown in Table 3, as follows:

TABLE 3

Example Sentences

| | |
|---|---|
| Sentence 1 | An error code per Section 4.1.2.1 of Oauth 2.0 Spec |
| Sentence 2 | This endpoint only applies to apps using the authorization code flow. |

For each of Sentence 1 and Sentence 2 (i.e. two different example sentences), a corresponding set of inputs may be derived and provided to the ML model 102A. The corresponding set of inputs may include features, such as, but not limited to, a description vector and an endpoint vector. The ML model 102A may be configured to output a prediction result for each of sentence 1 and sentence 2. The prediction results may be shown in Table 4, as follows:

TABLE 4

Example Prediction Result for Example Sentences

| | | |
|---|---|---|
| Sentence 1 | An error code per Section 4.1.2.1 of Oauth 2.0 Spec | 0 |
| Sentence 2 | This endpoint only applies to apps using the authorization code flow. | 1 |

From Table 4, it may be observed that the prediction result is "0" for sentence 1 and "1" for sentence 2. This may indicate that sentence 1 is a false description for "/oauth/token" endpoint and sentence 2 is a true description for "/oauth/token" endpoint. Further, the control may pass to end. Although the flowchart 300 is illustrated as discrete operations, such as 302, 304, 306, 308, 310, 312, 314, 316, and 318. However, in certain embodiments, such discrete operations may be further divided into additional operations, combined into fewer operations, or eliminated, depending on the particular implementation without detracting from the essence of the disclosed embodiments.

Figure 4A:
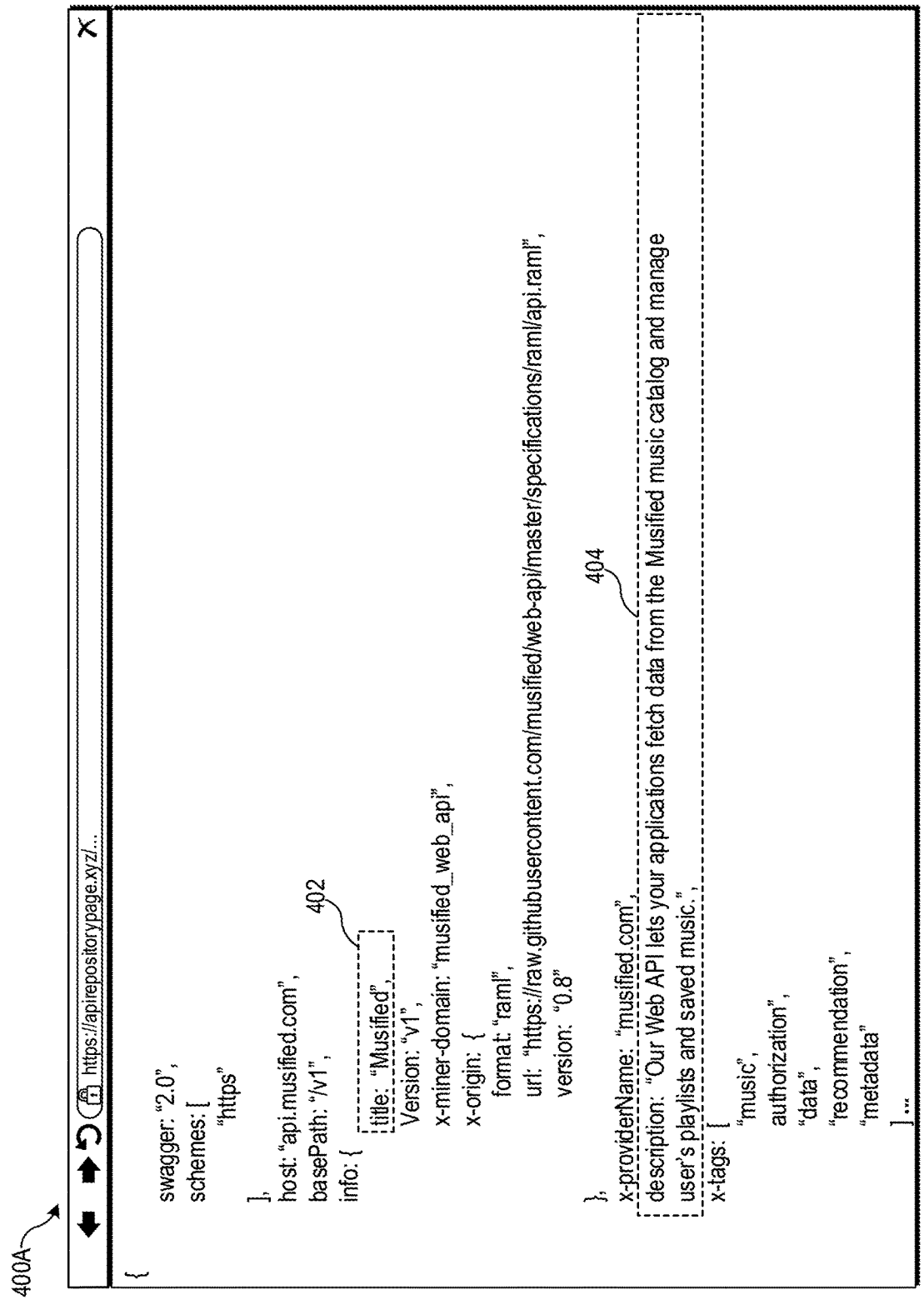
FIGS. 4A and 4B, collectively, illustrate example documents in a labelled repository.
Figure 4B:
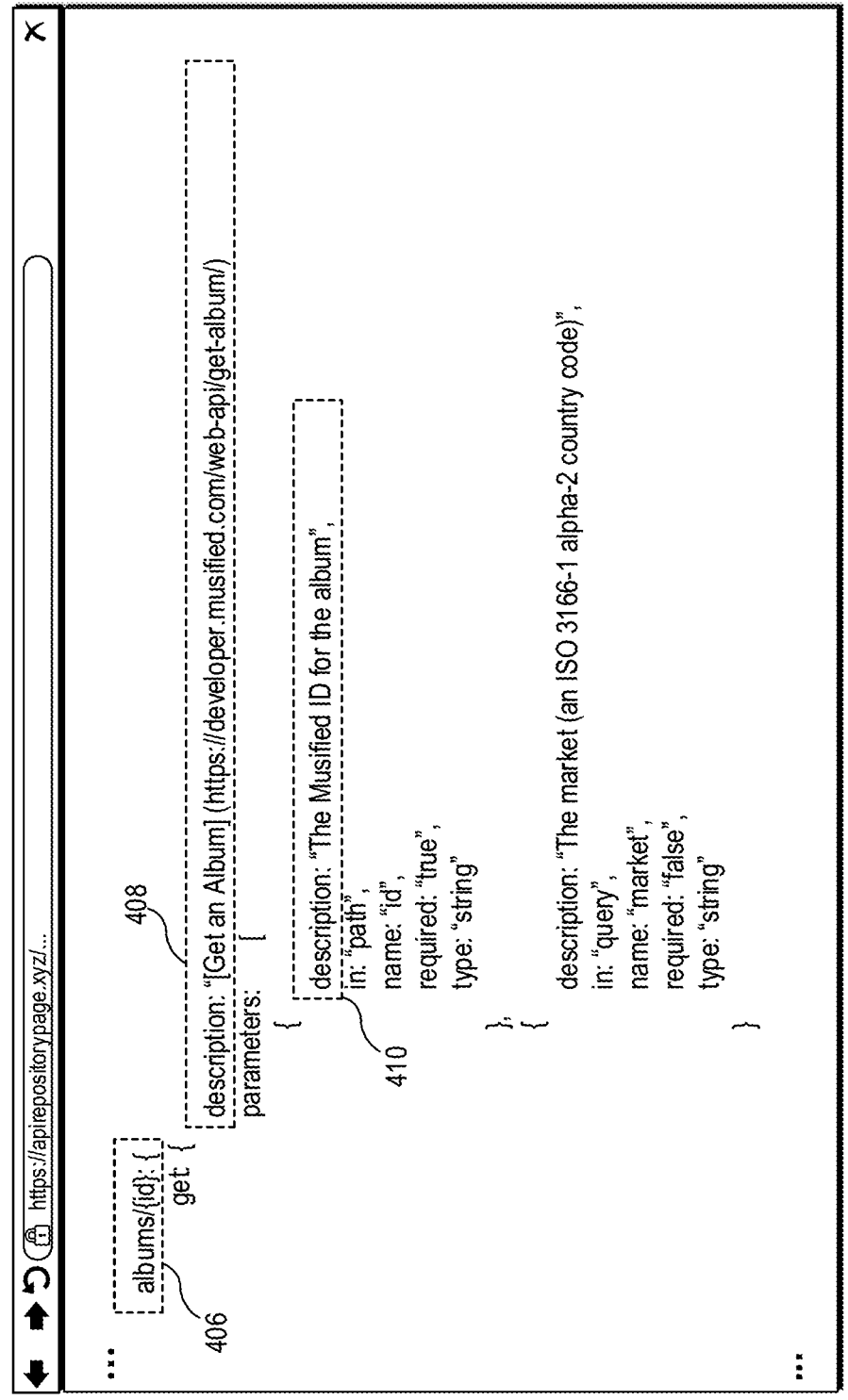

FIGS. 4A and 4B, collectively, illustrate example documents in a labelled repository, according to at least one embodiment described in the present disclosure. FIGS. 4A and 4B are explained in conjunction with elements from FIGS. 1, 2, and 3. With reference to FIGS. 4A and 4B, there is shown a set of structured specification documents, including a first structured specification document 400A and a second structured specification document 400B for an example web API, to be called Musified API for description purposes here. Each of the first structured specification document 400A and the second structured specification document 400B may be retrieved from an example labelled repository.

The first structured specification document 400A may be a web document belonging to the Musified API and may include a first portion of information associated with the Musified API within a markup/code. More specifically, the first portion of the information associated with the Musified API may be specified by one or more markup tags and/or markup categories on the first structured specification document 400A. As shown, the first structured specification document 400A includes an API title 402 as "title: Musified" and an API description 404 as "description: Our Web API lets your applications fetch data from the Musified music catalog and manage user's playlists and saved music."

The second structured specification document 400B may be also a web document belonging to the Musified API and may include a second portion of information associated with the Musified API within a markup/code. More specifically, the second portion of the information associated with the Musified API may be also specified by one or more markup tags and/or markup categories on the second structured specification document 400B. As shown, the second structured specification document 400B includes an endpoint name 406 as "albums/{id}", an endpoint description 408 as "[Get an album] (https://developer.musified.com/web-api/get-album/)" and an API input/output parameter description 410 as "The Musified ID for the album".

In one or more embodiments, the processor 204 may be configured to parse each of the first structured specification document 400A and the second structured specification document 400B to extract the endpoint description 408 for the endpoint name 406. The extracted endpoint description 408 may be identified (or marked) as a true endpoint description for the endpoint name 406.

Figure 5A:
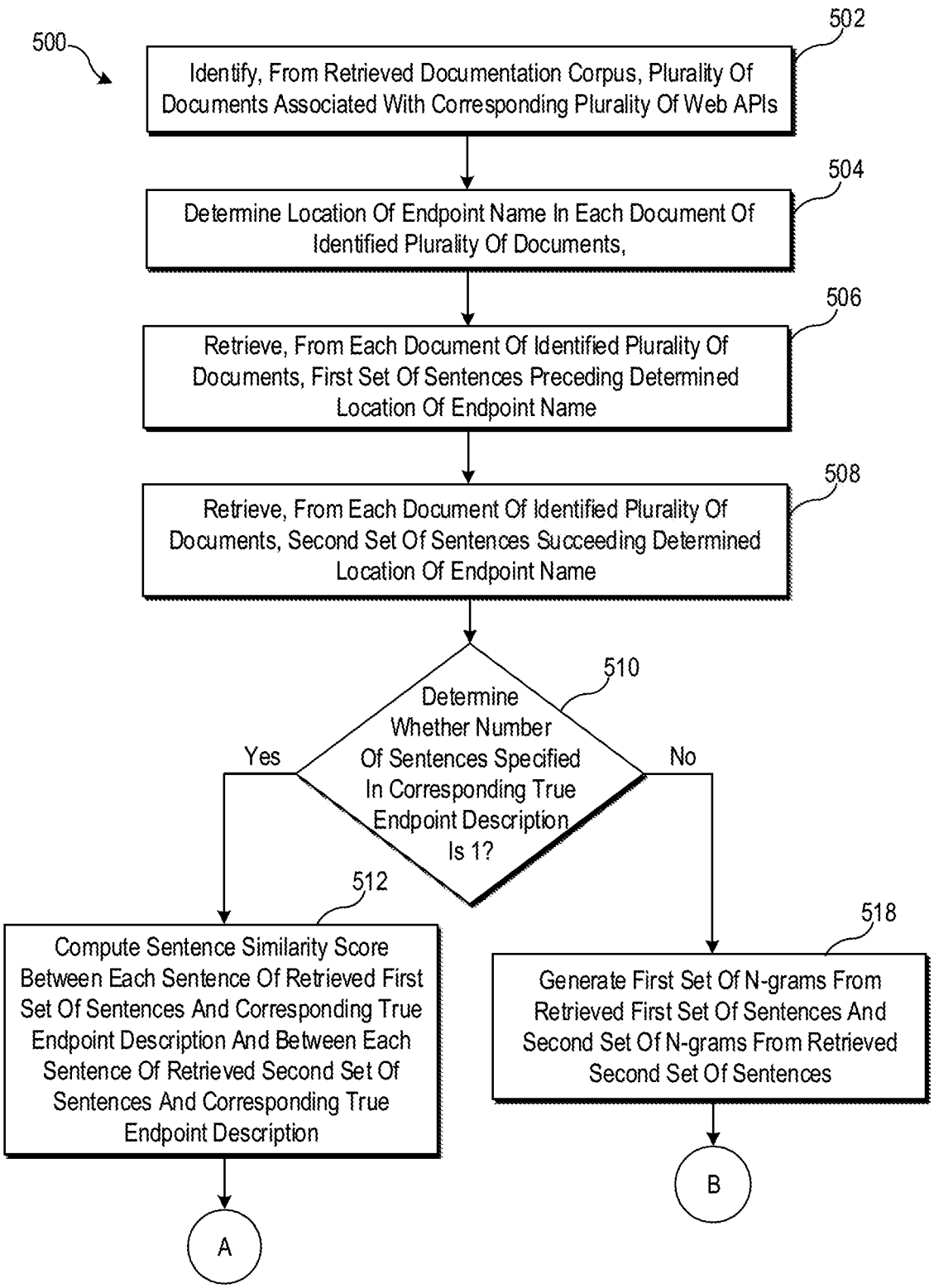
FIGS. 5A, 5B, and 5C, collectively, illustrate a flowchart of an example method of determining false endpoint description associated with web APIs.
Figure 5B:
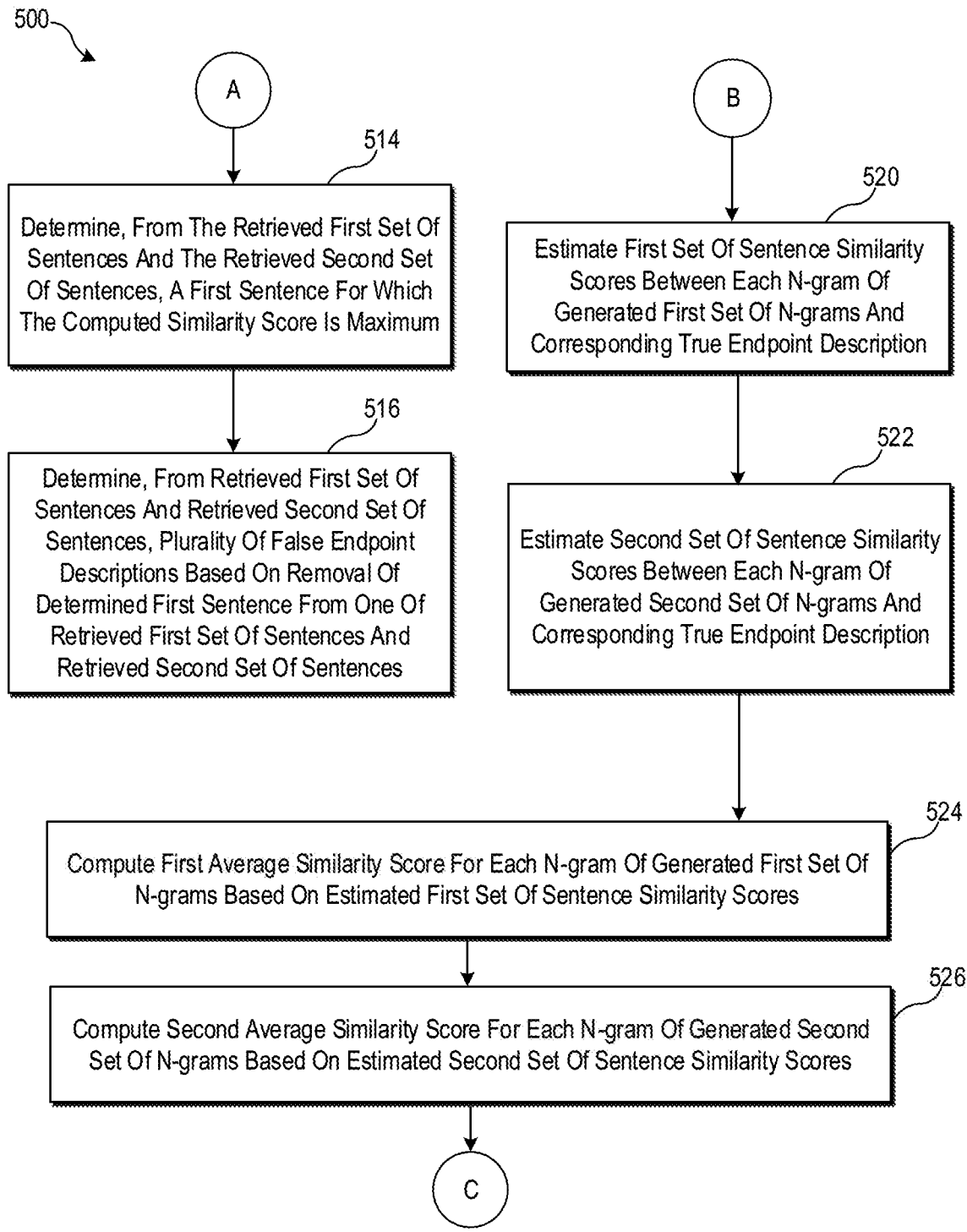
Figure 5C:
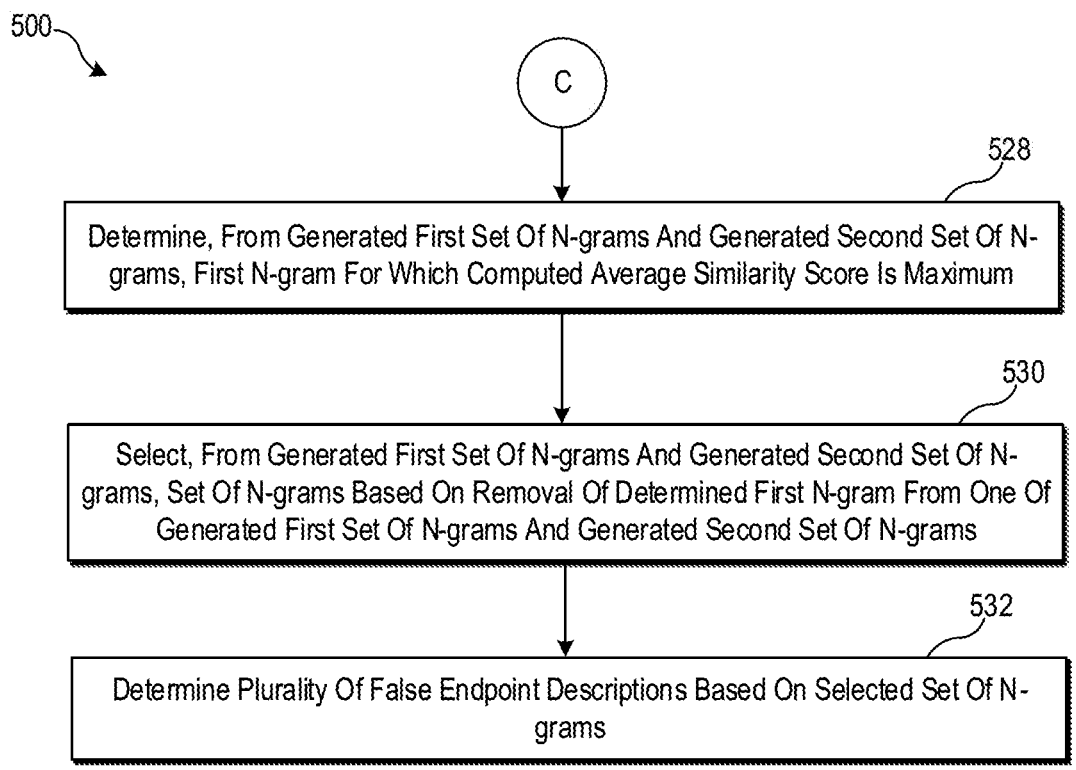

FIGS. 5A, 5B, and 5C, collectively, illustrate a flowchart of an example method of determining false endpoint description associated with web APIs, according to at least one embodiment described in the present disclosure. FIGS. 5A, 5B, and 5C are explained in conjunction with elements from FIGS. 1, 2, 3, 4A, and 4B. With reference to FIGS. 5A, 5B, and 5C, there is shown a flowchart 500. The method illustrated in the flowchart 500 may start at 502 and may be performed by any suitable system, apparatus, or device, such as by the example prediction system 202 of FIG. 2.

At 502, the plurality of documents associated with a corresponding plurality of web APIs may be identified from the retrieved documentation corpus 106. The documentation corpus 106 may include the collection of documents 112 associated with a corresponding collection of APIs. In one or more embodiments, the processor 204 may be configured to identify the plurality of documents associated with a corresponding plurality of web APIs from the retrieved documentation corpus 106.

At 504, a location of an endpoint name in each document of the identified plurality of documents may be identified. The endpoint name may be for a corresponding endpoint of a corresponding web API of the plurality of web APIs. In one or more embodiments, the processor 204 may be configured to identify the location of the endpoint name in each document of the identified plurality of documents. An example of the location of an endpoint name from an example document is provided, for example, in FIG. 6.

At 506, a first set of sentences preceding the determined location of the endpoint name may be retrieved from each document of the identified plurality of documents. In one or more embodiments, the processor 204 may be configured to retrieve the first set of sentences preceding the determined location of the endpoint name from each document of the identified plurality of documents.

At 508, a second set of sentences succeeding the determined location of the endpoint name may be retrieved from each document of the identified plurality of documents. In one or more embodiments, the processor 204 may be configured to retrieve the second set of sentences succeeding the determined location of the endpoint name from each document of the identified plurality of documents.

In one or more embodiments, the first set of sentences and the second set of sentences may be retrieved further based on application of a sentence tokenization operation (e.g., by using Natural Language Toolkit (NLTK), Spacy or other similar NLP tools) on a corresponding document of the plurality of documents. In the sentence tokenization operation, a stream of text (e.g., a sentence) may be broken down into sentences, words, phrases, symbols, or other meaningful elements which may be also referred to as a plurality of sentence-tokens (or a plurality of sentences). Further, after application of the sentence tokenization operation, each sentence of the plurality of sentences may be filtered based on removal of one or more of a stopping word, a symbol, a special character, a space between two characters, or a short-description sentence, some obvious "bad" sentences which cannot be used as endpoint descriptions, and too short phrases/words (such as "1" word). Also, a stemming operation may be applied on each sentence of the filtered plurality of sentences. In the stemming operation, morphological variants of a root/base word may be obtained for a corresponding word in each sentence of the filtered plurality of sentences. More specifically, the stemming operation may reduce words in each sentence of the filtered plurality of sentences to root words or morphological variants of the root words. Further, in some embodiments, a number of sentences (also referred to as a span) specified in a corresponding true endpoint description of the extracted plurality of true endpoint descriptions may be determined for the corresponding endpoint of the corresponding web API.

At 510, it may be determined whether the number of sentences specified in the corresponding true endpoint description is one ("1"). In one or more embodiments, the processor 204 may be configured to determine whether the number of sentences specified in the corresponding true endpoint description is one ("1"). In case the number of sentences specified in the corresponding true endpoint description is one ("1"), control may pass to 512. Otherwise, control may pass to 518.

At 512, a sentence similarity score may be computed between each sentence of the retrieved first set of sentences and the corresponding true endpoint description and between each sentence of the retrieved second set of sentences and the corresponding true endpoint description. The sentence similarity score may be computed based on the determination that the number of sentences specified in the corresponding true endpoint description is one ("1"). As an example, the sentence similarity may be computed based on NLP tools, such as spacy similarity or cosine similarity between word vector representations (in terms of vector space with word embedding) of each sentence of the retrieved first set of sentences and the corresponding true endpoint description and between word vector representations each sentence of the retrieved second set of sentences and the corresponding true endpoint description.

At 514, a first sentence may be determined from the retrieved first set of sentences and the retrieved second set of sentences for which the computed similarity score is maximum. In one or more embodiments, the processor 204 may be configured to determine, from the retrieved first set of sentences and the retrieved second set of sentences, the first sentence for which the computed similarity score is maximum.

At 516, the plurality of false endpoint descriptions may be determined from the retrieved first set of sentences and the retrieved second set of sentences based on removal of the determined first sentence from one of the retrieved first set of sentences and the retrieved second set of sentences. In other words, all the sentences in the retrieved first set of sentences (say "M" sentences) and the retrieved second set of sentences (say "N" sentences) except the first sentence may be considered as the false endpoint descriptions (i.e. "N+M−1" sentences) for the corresponding endpoint. Whereas, the first sentence (i.e. highest similarity sentence) may be considered as the true endpoint description. In one or more embodiments, the processor 204 may be configured to determine the plurality of false endpoint descriptions from the retrieved first set of sentences and the retrieved second set of sentences.

At 518, a first set of n-grams may be generated from the retrieved first set of sentences and a second set of n-grams may be generated from the retrieved second set of sentences. The first set of n-grams and the second set of n-grams may be generated based on the determination that the number of sentences specified in the corresponding true endpoint description is greater than one ("1"). For example, an example template for the first set of sentences, the second set of sentences, and the true endpoint description is provided in Table 5, as follows:

TABLE 5

Example Template for the first set of sentences and the second set of sentences

| First Set of Sentences | Second Set of Sentences | True Endpoint Description |
| --- | --- | --- |
| Sentence 11 | Sentence 12 | (True sentence 1 (TS1), |
| Sentence 21 | Sentence 22 | True sentence (TS2)) |
| Sentence 31 | Sentence 32 | |
| . . . | . . . | |

Based on Table 5, it can be observed that the true endpoint description includes two sentences (i.e. True sentence 1 and True sentence 2) and therefore, a first set of bi-grams (n=2) and a second set of bi-grams may be generated. An example template for the first set of bi-grams and the second set of bi-grams is provided in Table 6, as follows:

TABLE 6

Example template for the first set of bi-grams and the second set of bi-grams

| First Set of Bi-grams | Second Set of Bi-grams |
| --- | --- |
| (Sentence 31, Sentence 21) | (Sentence 32, Sentence 22) |
| (Sentence 21, Sentence 11) | (Sentence 22, Sentence 12) |
| (Sentence 31, Sentence 11) | (Sentence 32, Sentence 12) |
| . . . | . . . |

At 520, a set of sentence similarity scores may be estimated between each n-gram of the generated first set of n-grams and the corresponding true endpoint description. In one or more embodiments, the processor 204 may be configured to estimate the first set of sentence similarity scores between each n-gram of the generated first set of n-grams and the corresponding true endpoint description. In certain instances, a sentence similarity score between each n-gram and the corresponding true endpoint description may correspond to a similarity measure between word vector representations of each n-gram and the corresponding true endpoint description. The similarity measure may be, but not limited to, a cosine similarity, a spacy similarity, or other NLP-based similarity measure methods.

As an example, for a bi-gram (Sentence 31, Sentence 21) in table 6, the corresponding sentence similarity scores may be estimated as follows:

$$\text{Sentence Similarty Score } (S_1) = \text{Similarity}(\text{sentence31}, TS1) \qquad (1)$$

$$\text{Sentence Similarty Score } (S_2) = \text{Similarity}(\text{sentence31}, TS2) \qquad (2)$$

$$\text{Sentence Similarty Score } (S_3) = \text{Similarity}(\text{sentence21}, TS1) \qquad (3)$$

$$\text{Sentence Similarty Score } (S_4) = \text{Similarity}(\text{sentence21}, TS2) \qquad (4)$$

Where, Similarity(.) is a sentence similarity function (e.g., spacy similarity or cosine similarity).

At 522, a second set of sentence similarity scores may be estimated between each n-gram of the generated second set of n-grams and the corresponding true endpoint description. In one or more embodiments, the processor 204 may be configured to estimate the second set of sentence similarity scores between each n-gram of the generated second set of n-grams and the corresponding true endpoint description.

As an example, for a bi-gram (Sentence 32, Sentence 22) in table 6, the corresponding sentence similarity scores may be estimated as follows:

$$\text{Sentence Similarty Score } (S_1') = \text{Similarity(sentence32}, TS1) \quad (5)$$

$$\text{Sentence Similarty Score } (S_2') = \text{Similarity(sentence32}, TS2) \quad (6)$$

$$\text{Sentence Similarty Score } (S_3') = \text{Similarity(sentence22}, TS1) \quad (7)$$

$$\text{Sentence Similarty Score } (S_4') = \text{Similarity(sentence22}, TS2) \quad (8)$$

Where, Similarity(.) is the sentence similarity function (e.g., spacy similarity or cosine similarity).

At 524, a first average similarity score may be computed for each n-gram of the generated first set of n-grams based on the estimated first set of sentence similarity scores. In one or more embodiments, the processor 204 may be configured to compute the first average similarity score for each n-gram of the generated first set of n-grams. In general, an average sentence similarity score ($S_{av}$) may be given, for example, by equation (9) as follows:

$$S_{av} = \frac{\Sigma_i S_i}{N} \quad (9)$$

Where, $S_i$ may correspond to the sentence similarity between an $i^{th}$ sentence of an n-gram and a sentence in the corresponding true endpoint description, N may correspond to a total number of sentence similarity computations for the n-gram, and i may correspond to an index (or identifier) for a sentence in the n-gram. As an example, from equations (1), (2), (3) and (4), $S_1$, $S_2$, $S_3$, and $S_4$ may be used to compute the first average sentence similarity score ($S_{av1}$), given by equation (10) as follows:

$$S_{av1} = \frac{S_1 + S_2 + S_3 + S_4}{4} \quad (10)$$

At 526, a second average similarity score for each n-gram of the generated second set of n-grams may be computed based on the estimated second set of sentence similarity scores. In one or more embodiments, the processor 204 may be configured to compute the second average similarity score for each n-gram of the generated second set of n-grams. As an example, from equations (5), (6), (7) and (8), $S_5$, $S_6$, $S_7$, and $S_8$ may be used to compute the second average sentence similarity score ($S_{av2}$), given by equation (11) as follows:

$$S_{av2} = \frac{S_5 + S_6 + S_7 + S_8}{4} \quad (11)$$

At 528, a first n-gram for which the computed average similarity score is maximum may be determined from the generated first set of n-grams and the generated second set of n-grams. In one or more embodiments, the processor 204 may be configured to determine the first n-gram for which the computed average similarity score is maximum from the generated first set of n-grams and the generated second set of n-grams.

At 530, a set of n-grams may be selected from the generated first set of n-grams and the generated second set of n-grams based on removal of the determined first n-gram from one of the generated first set of n-grams and the generated second set of n-grams. In one or more embodiments, the processor 204 may be configured to select the set of n-grams from the generated first set of n-grams and the generated second set of n-grams. The first n-gram may correspond to a highest similarity n-gram and may be considered as the true description associated with an endpoint of a specific web API. Whereas, remaining n-grams (i.e. the selected set of n-grams) may be considered as false descriptions associated with the endpoint.

At 532, the plurality of false endpoint descriptions may be determined based on the selected set of n-grams. In one or more embodiments, the processor 204 may be configured to determine the plurality of false endpoint descriptions based on the selected set of n-grams. Specifically, each sentence in each n-gram of the selected set of n-grams may be considered as a false endpoint description associated with the corresponding endpoint. Further, the control may pass to end. Although the flowchart 500 is illustrated as discrete operations, such as 502, 504, 506, 508, 510, 512, 514, 516, 518, 520, 524, 526, 528, 530, and 532. However, in certain embodiments, such discrete operations may be further divided into additional operations, combined into fewer operations, or eliminated, depending on the particular implementation without detracting from the essence of the disclosed embodiments.

Figure 6:
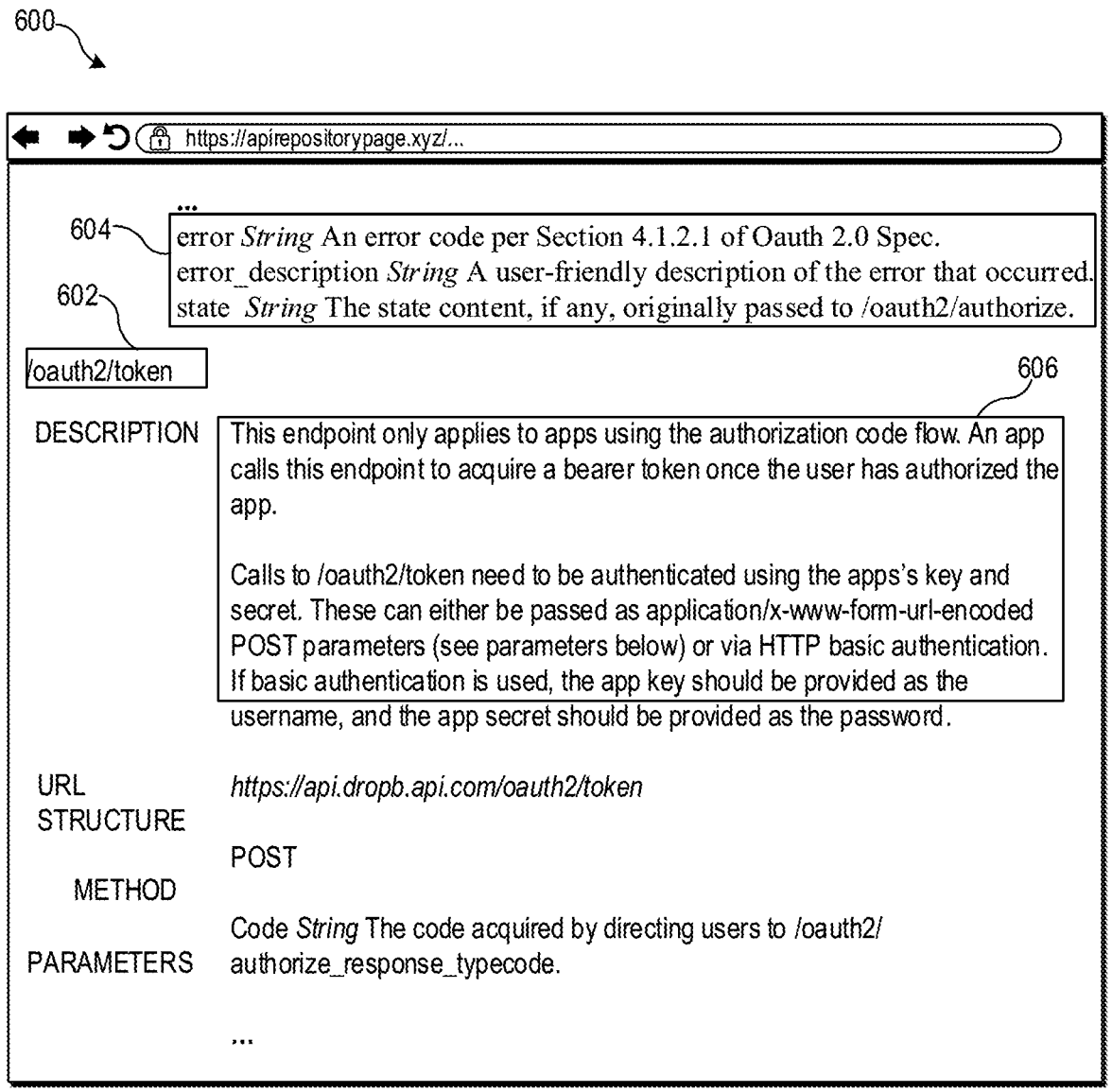
FIG. 6 illustrates an example document in a documentation corpus.

FIG. 6 illustrates an example document in a documentation corpus, according to at least one embodiment described in the present disclosure. FIG. 6 is explained in conjunction with elements from FIGS. 1, 2, 3, 4A, 4B, 5A, 5B, and 5C. With reference to FIG. 6, there is shown an example document 600 which may be present in the document corpus 106.

The example document 600 may be a web document belonging to a "DropB API" and may include information associated with the "DropB API" within different categories, such as "Description", "URL Structure", "Method", and "Parameters". The processor 204 may be configured to identify a location of the endpoint name 602 (i.e. "/oauth2/token") in the example document 600. The endpoint name 602 may be for a specific endpoint (i.e. "token") of a specific web API ("DropB API"). Thereafter, the processor 204 may be configured to retrieve a first set of sentences 604 preceding the determined location of the endpoint name 602 from the example document 600 and a second set of sentences 606 succeeding the determined location of the endpoint name 602 from the example document 600.

The first set of sentences 604 includes "3" sentences, given as follows: {"error String An error code per Section 4.1.2.1 of Oauth 2.0 Spec.", "error_description String A user-friendly description of the error that occurred.", "state String The state content, if any, originally passed to /oauth2/authorize."}.

Similarly, the second set of sentences 606 includes "4" sentences, given as follows: {"This endpoint only applies to apps using the authorization code flow.", "An app calls this endpoint to acquire a bearer token once the user has authorized the app.", "Calls to /oauth2/token need to be authenticated using the apps s key and secret.", "These can either be passed as application/x-www-form-url-encoded POST parameters (see parameters below) or via HTTP basic authentication."}. Details of determination of false endpoint descriptions from the first set of sentences 604 and the second set of sentences 606 may be same as described, for example, in FIGS. 5A, 5B, and 5C.

Figure 7:
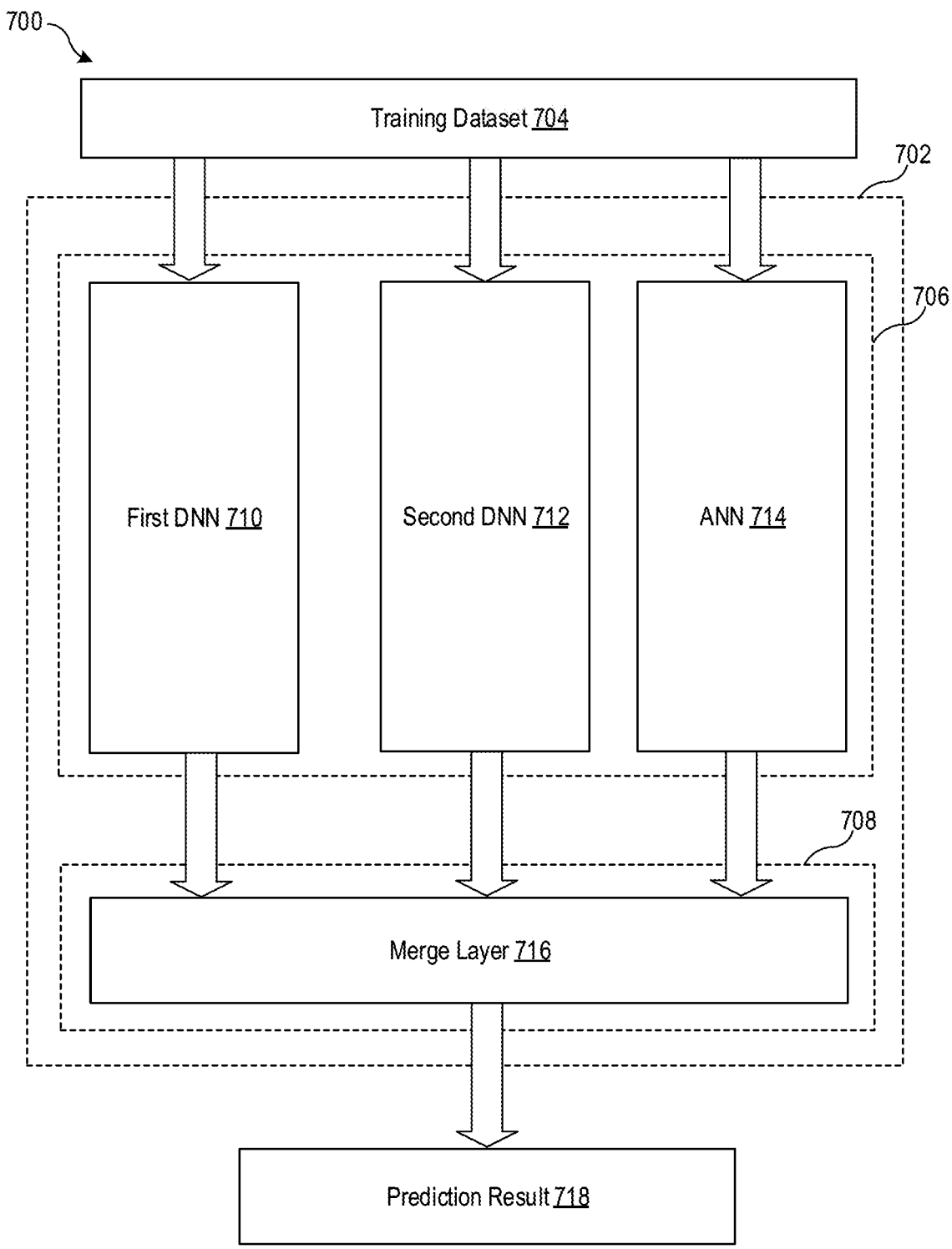
FIG. 7 illustrates a block diagram of an example ML model, all according to at least one embodiment described in the present disclosure.

FIG. 7 illustrates a block diagram of an example ML model, according to at least one embodiment described in the present disclosure. FIG. 7 is explained in conjunction with elements from FIGS. 1, 2, 3, 4A, 4B, 5A, 5B, 5C, and 6. With reference to FIG. 7, there is shown a block diagram 700 of an example ML model 702 which may correspond to the ML model 102A. Also, the example ML model 702 may be obtained (i.e. trained) by providing feature information corresponding to a plurality of features of an example training dataset 704 as an input to the example ML model 702. The plurality of features in the example training dataset 704 may include, but are not limited to, an endpoint vector feature, a description vector feature, a HTTP method feature, a cosine similarity feature, a spacy similarity feature, a session segment feature, a description tag feature, a number of tokens feature, and a count of endpoint names feature.

In one or more embodiments, the example ML model 702 may include electronic data, such as, for example, a software program, code of the software program, libraries, applications, scripts, or other logic or instructions for execution by a processing device, such as the processor 204. The example ML model 702 may include code and routines configured to enable a computing device, such as the processor 204 to perform one or more operations for classification of one or more inputs (e.g., features from sentences in API documentations) into one of a true description or a false description associated with an endpoint of a specific web API. Additionally or alternatively, the example ML model 702 may be implemented using hardware including a processor, a microprocessor (e.g., to perform or control performance of one or more operations), a field-programmable gate array (FPGA), or an application-specific integrated circuit (ASIC). In some other instances, the example ML model 702 may be implemented using a combination of hardware and software.

The example ML model 702 may be a multistage neural network-based model and may include a first stage 706 and a second stage 708. The first stage 706 may include a pair of DNNs 710-712 arranged in parallel with an ANN 714. The pair of DNNs 710-712 may include a first DNN 710 and a second DNN 712. Further, the second stage 708 may include a merge layer 716 for merging a pair of first outputs from the pair of DNNs 710-712 and a second output from the ANN 714. As an example, the merge layer 716 may take as input a list of tensors, all of the same shape, and return a single tensor (also of the same shape). In certain embodiments, each DNN of the pair of DNNs 710-712 may be one of a CNN or a LSTM-based DNN.

In accordance with an embodiment, the example ML model 702 may be a "CNN+ANN hybrid network", where the first DNN 710 may be a first CNN and the second DNN 712 may be a second CNN. Each of the first CNN and the second CNN may include a first sequence of layers coupled in a series configuration. The first sequence of layers may include, but are not limited to, an embedding layer, a one-dimensional (1D) convolution layer, a first dropout layer, 1D max pooling layer, a flattening layer, a first dense layer, a first batch normalization layer, a second dropout layer, a second dense layer, a second batch normalization layer, a third dropout layer, a third dense layer, a third batch normalization layer, a fourth dropout layer, and a fourth dense layer. The output of a previous layer in the first sequence of layers may be provided as an input to a next layer in the first sequence of layers. Similarly, the ANN 714 may include a second sequence of layers coupled in a series configuration. The second sequence of layers may include, but are not limited to, a first dense layer, a first batch normalization layer, a first dropout layer, a second dense layer, a second batch normalization layer, a second dropout layer, a third dense layer, a third batch normalization layer, a third dropout layer, a fourth dense layer, a fourth batch normalization layer, a fourth dropout layer, and a fifth dense layer. The output of a previous layer in the second sequence of layers may be also provided as an input to a next layer in the second sequence of layers.

The merge layer 716 may a combination of a third sequence of layers, including, but not limited to, a first dense layer, a first batch normalization layer, a first dropout layer, a second dense layer, a second batch normalization layer, a second dropout layer, a third dense layer, a third batch normalization layer, a third dropout layer, a fourth dense layer, a fourth batch normalization layer, a fourth dropout layer, and a fifth dense layer. The output of a previous layer in the third sequence of layers may be provided as an input to a next layer in the third sequence of layers.

Each layer in the first sequence of layers, the second sequence of layers, and the third sequence of layers may correspond to a computational operation or a set of computational operations to be executed on inputs from a previous layer. Also, each layer in the first sequence of layers, the second sequence of layers, and the third sequence of layers may be associated with one or more parameters, such as, but not limited to, a batch size, an input length, a vocabulary size, a dimension of dense embedding, a regularization function, a constraint function, or a combination thereof.

In accordance with an embodiment, the example ML model 702 may be a "LSTM+ANN hybrid network". Here, each of the first DNN 710 and the second DNN 712 may be an LSTM-based DNN. Each of the first DNN 710 and the second DNN 712 of the "LSTM+ANN hybrid network" may include a sequential arrangement of an embedding layer, an LSTM network, a dropout layer, and a dense layer. The output of the dense layer may be coupled directly to an input of the merge layer 716. Further, the output of the ANN 714 may be coupled directly to the merge layer 716. The ANN 714 may include a sequence of layers including, but not limited to, a first dense layer, a first batch normalization layer, a first dropout layer, a second dense layer, a second batch normalization layer, a second dropout layer, a third dense layer, a third batch normalization layer, a third dropout layer, a fourth dense layer, a fourth batch normalization layer, a fourth dropout layer, and a fifth dense layer. Similarly, the merge layer 716 may a combination of a sequence of layers including, but not limited to, a first dense layer, a first batch normalization layer, a first dropout layer, a second dense layer, a second batch normalization layer, a second dropout layer, a third dense layer, a third batch normalization layer, a third dropout layer, a fourth dense layer, a fourth batch normalization layer, a fourth dropout layer, and a fifth dense layer. Here, the output from the fifth layer of the merge layer 716 may be a final output of the example ML model 702.

Herein, an example method of obtaining the example ML model 702 (i.e. trained ML model) is provided. The example method may be performed by any suitable system, apparatus, or device, such as by the processor 204 of the example prediction system 202 of FIG. 2. In the example method, a set of endpoint vectors corresponding to an endpoint vector feature of the example training dataset 704 may be provided to the first DNN 710 of the pair of DNNs 710-712. Further, a set of description vectors corresponding to a description vector feature of the example training dataset 704 may be provided to the second DNN 712 of the pair of DNNs 710-712. A portion of the feature information corresponding to remaining set of features of the generated training dataset may be provided as an input to the ANN 714. The portion of the feature information may include, for example, HTTP methods, cosine similarity scores, spacy similarity scores, session segment values, description tag values, number of tokens, and a count of endpoint names.

The pair of first outputs from the pair of DNNs 710-712 and the second output from the ANN 714 may be provided to the merge layer 716 and a training operation may be executed on the pair of DNNs 710-712 and the ANN 714 to obtain the example ML model 702 (i.e. trained ML model). The training operation may be executed based on the provided set of endpoint vectors, the provided set of description vectors, the provided portion of the feature information corresponding to the remaining set of features, the provided pair of first outputs, and the second output. During the execution of the training operation, the "Is Description" feature (as shown for example, in Table 3) may be used as ground truth values to update weights of the example ML model 702 till a global minima of a cost function for the example ML model 702 is achieved in certain number of epochs. Further, during the execution of the training operation, one or more hyper-parameters, for example, network structure/size, learning rate, etc., for the example ML model 702 may be recursively updated for certain number of epochs till the global minima of the cost function is achieved.

In accordance with an embodiment, once trained, the example ML model 702 may be deployed on the example prediction system 202 (e.g., on backend servers of the example prediction system 202) for classification of a set of inputs as one of the true description or the false description associated with the endpoint. As an example, once deployed, a frontend interface (e.g., front end servers) of the example prediction system 202 may be configured to receive an endpoint name and a set of sentences which may be retrieved, for example, from other documents (such as unlabeled/unprocessed/test documents) in the documentation corpus 106. Further, feature information may be extracted for the received set of sentences based on the received endpoint name and the received set of sentences. The feature information may include, but are not limited to, an endpoint vector, a description vector, a HTTP method, a cosine similarity, a spacy similarity score, a session segment value, a description tag value, a number of tokens in the received one or more sentences, or a count of endpoint name in the received one or more sentences. Further, the extracted feature information may be provided as the set of inputs to the deployed example ML model 702. The example ML model 702 may output a prediction result 718 (e.g., a "0" or a "1") which may classify the one or more sentences as one of a true description or a false description associated with the received endpoint name.

Figure 8:
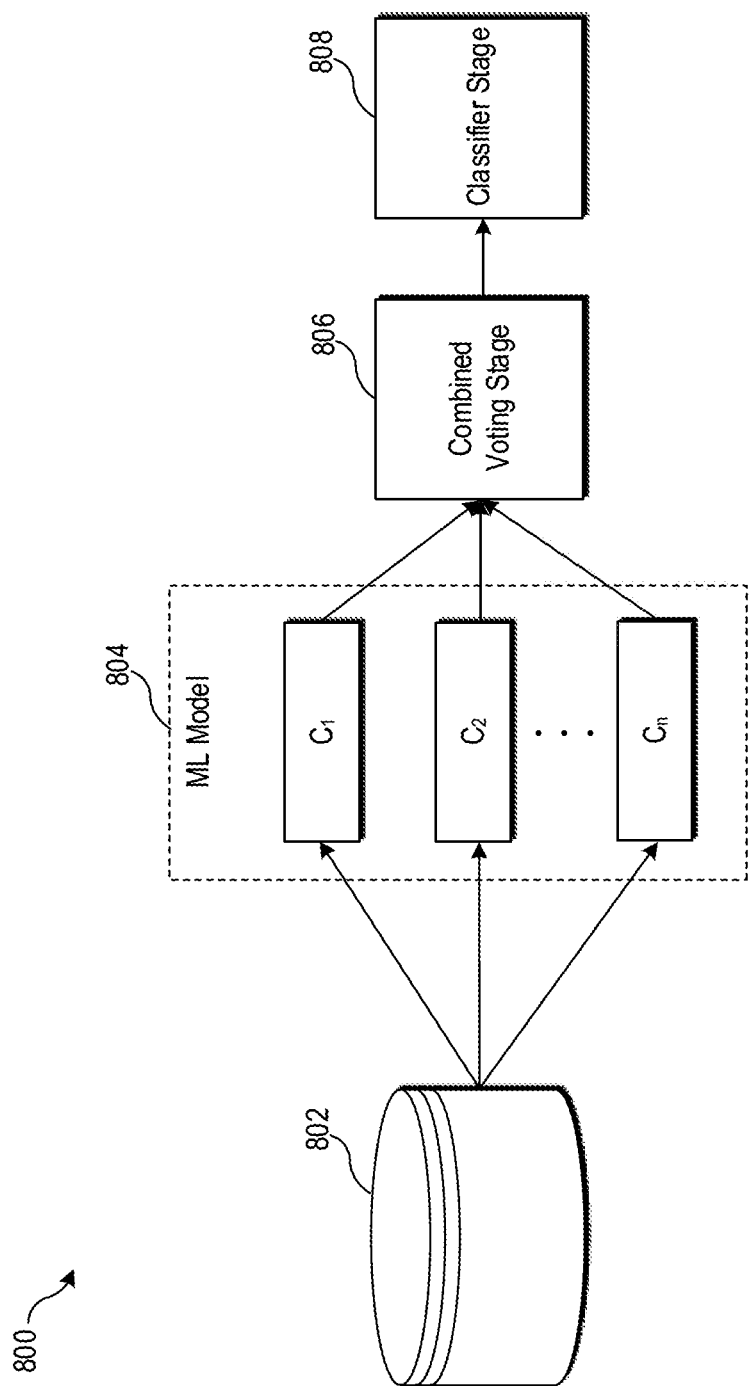
FIG. 8 is a block diagram illustrating an ensemble approach, in accordance with according to at least one embodiment described in the present disclosure.

FIG. 8 is a block diagram illustrating an ensemble approach, in accordance with according to at least one embodiment described in the present disclosure. FIG. 8 is explained in conjunction with elements from FIGS. 1, 2, 3, 4A, 4B, 5A, 5B, 5C, 6 and 7. With reference to FIG. 8, there is shown a block diagram 800 that includes an example training dataset 802, an ML model 804 comprising a plurality of models ($C_1, C_2 \ldots C_n$), a combined voting stage 806, and a final classifier stage 808. The example training dataset 802 may be same as the example training dataset 704 and may include training data for the plurality of ML models. In ML, the training data needs to be "balanced", which means that a training dataset should include similar number of good examples and bad examples; however, endpoint description sentences are "imbalanced" because only a very small percentage of sentences are correct endpoint description sentences, while a larger percentage of sentences are incorrect description sentences. Accordingly, more incorrect endpoint description sentences may be collected as compared to a collection of correct endpoint description sentences. For this reason, an ensemble approach may be used in the disclosure to classify a given input as one of a true description or a false description associated with an endpoint of a specific web API.

Each model $C_i$ (i=1, 2 . . . n) of the plurality of models ($C_1, C_2 \ldots C_n$) may be one trained model, for example, a "CNN+ANN" hybrid network or a "LSTM+ANN" hybrid network of FIG. 7. Each $C_i$ may be trained with correct endpoint description sentences and different incorrect endpoint description sentences from the example training dataset 802. This may be achievable because many more incorrect descriptions sentences than correct description sentences are collected. Therefore, for training each $C_i$ the number of correct endpoint description sentences and incorrect endpoint description sentences may be similar. In this case, each model Ci may make different decisions based on the features it learned. In the combined voting stage 806, each model Ci (i=1, 2 . . . n) of the plurality of models ($C_1, C_2 \ldots C_n$) may predict independently and vote to decide whether a given input sentence is a correct endpoint description. In the final classifier stage 808, the given input sentence is finally predicted as one of an incorrect endpoint description or a correct endpoint description based on votes of the plurality of models ($C_1, C_2 \ldots C_n$).

For example, "7" Ci models may be deployed, each trained with different incorrect sentences and therefore learned different incorrect sentence features. For a given input sentence, "4" models may predict a given input sentence to be incorrect and "3" models may predict the given input sentence to be correct. In the final classifier stage 808, the given input sentence is finally predicted as an incorrect endpoint description based on votes of the "7" Ci models.

In one or more embodiments, the example training dataset 802 may include feature information for a given input sentence and may be provided as a set of inputs to the plurality of models ($C_1, C_2 \ldots C_n$). The processor 204 may be configured to classify the provided set of inputs as one of the true description or the false description associated with the endpoint based on the ensemble approach that relies on a plurality of votes of the ML model 804. The ML model 804 may include plurality of models ($C_1, C_2 \ldots C_n$) trained on different data points of the training dataset.

Various embodiments of the disclosure may provide one or more non-transitory computer-readable storage media configured to store instructions that, in response to being executed, cause a prediction system (such as the example prediction system 202) to perform operations. The operations may include extracting, from a labelled repository (such as the labelled repository 104), a plurality of true endpoint descriptions associated with a plurality of web APIs and retrieving a documentation corpus (e.g., the documentation corpus 106) associated with the plurality of web APIs. The operation may further include determining a plurality of false endpoint descriptions associated with the plurality of web APIs based on the retrieved documentation corpus and the extracted plurality of true endpoint descriptions and extracting feature information corresponding to a plurality of features associated with the plurality of web APIs based on the extracted plurality of true endpoint descriptions, the retrieved documentation corpus, and the determined plurality of false endpoint descriptions. The operations may further include generating a training dataset based on the extracted feature information and obtaining a ML model (such as the ML model 102A) based on the generated training dataset. The operations may further include providing a set of inputs to the ML model and classifying the provided set of inputs as one of a true description or a false description of the endpoint based on a prediction result of the ML model for the provided set of inputs. The set of inputs may be associated with an endpoint for a specific web API of the plurality of web APIs.

As indicated above, the embodiments described in the present disclosure may include the use of a special purpose or general purpose computer (e.g., the processor 204 of FIG. 2) including various computer hardware or software modules, as discussed in greater detail below. Further, as indicated above, embodiments described in the present disclosure may be implemented using computer-readable media (e.g., the memory 206 or the persistent data storage 208 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:
1. A method, comprising:
extracting, from a labelled repository, a plurality of true endpoint descriptions associated with a plurality of web Application Programming Interfaces (APIs);
retrieving a documentation corpus associated with the plurality of web APIs;

determining a plurality of false endpoint descriptions associated with the plurality of web APIs based on the retrieved documentation corpus and the extracted plurality of true endpoint descriptions;

extracting feature information corresponding to a plurality of features associated with the plurality of web APIs based on the extracted plurality of true endpoint descriptions, the retrieved documentation corpus, and the determined plurality of false endpoint descriptions;

generating a training dataset based on the extracted feature information;

obtaining a machine learning (ML) model based on the generated training dataset;

providing a set of inputs to the ML model, wherein the set of inputs are associated with an endpoint for a specific web API of the plurality of web APIs; and classifying the provided set of inputs as one of a true description or a false description associated with the endpoint based on a prediction result of the ML model for the provided set of inputs;

wherein the determining the plurality of false endpoint descriptions further comprises, identifying, from the retrieved documentation corpus, a plurality of documents associated with a corresponding plurality of web APIs, wherein the documentation corpus comprises a collection of documents associated with a corresponding collection of APIs;

determining a location of an endpoint name in each document of the identified plurality of documents, wherein the endpoint name is for a corresponding endpoint of a corresponding web API of the plurality of web APIs;

retrieving, from each document of the identified plurality of documents, a first set of sentences preceding the determined location of the endpoint name;

retrieving, from each document of the identified plurality of documents, a second set of sentences succeeding the determined location of the endpoint name; and determining, for the corresponding endpoint of the corresponding web API, a number of sentences specified in a corresponding true endpoint description of the extracted plurality of true endpoint descriptions; and wherein the method further comprises, generating a first set of n-grams from the retrieved first set of sentences and a second set of n-grams from the retrieved second set of sentences, based on the determination that the number of sentences specified in the corresponding true endpoint description is greater than one; and estimating a first set of sentence similarity scores between each n-gram of the generated first set of n-grams and the corresponding true endpoint description.

2. The method according to claim 1, wherein the labelled repository comprises a plurality of structured specification documents associated with the plurality of web APIs, wherein each API specification document comprises information mapped to a plurality of fields associated with a corresponding web API of the plurality of web APIs, and wherein the plurality of fields comprises an API title field, an endpoint name field, and an endpoint description field.

3. The method according to claim 1, further comprising:
computing a sentence similarity score between each sentence of the retrieved first set of sentences and the corresponding true endpoint description and between each sentence of the retrieved second set of sentences and the corresponding true endpoint description, wherein sentence similarity score is computed based on the determination that the number of sentences specified in the corresponding true endpoint description is one;

determining, from the retrieved first set of sentences and the retrieved second set of sentences, a first sentence for which the computed similarity score is maximum; and determining, from the retrieved first set of sentences and the retrieved second set of sentences, the plurality of false endpoint descriptions based on removal of the determined first sentence from one of the retrieved first set of sentences and the retrieved second set of sentences.

4. The method according to claim 1, further comprising:
estimating a second set of sentence similarity scores between each n-gram of the generated second set of n-grams and the corresponding true endpoint description;

computing a first average similarity score for each n-gram of the generated first set of n-grams based on the estimated first set of sentence similarity scores;

computing a second average similarity score for each n-gram of the generated second set of n-grams based on the estimated second set of sentence similarity scores;

determining, from the generated first set of n-grams and the generated second set of n-grams, a first n-gram for which the computed average similarity score is maximum;

selecting, from the generated first set of n-grams and the generated second set of n-grams, a set of n-grams based on removal of the determined first n-gram from one of the generated first set of n-grams and the generated second set of n-grams; and determining the plurality of false endpoint descriptions based on the selected set of n-grams.

5. The method according to claim 1, further comprising constructing an initial dataset associated with the plurality of web APIs based on the extracted plurality of true endpoint descriptions, the retrieved documentation corpus, and the determined plurality of false endpoint descriptions.

6. The method according to claim 5, wherein the initial dataset corresponds to a database table having a plurality of categorical variables and a binary variable, wherein the plurality of categorical variables comprises an API name, an endpoint name, and an endpoint description, and wherein the binary variable is indicative of whether the endpoint description is the true description of the endpoint name.

7. The method according to claim 5, further comprising extracting the feature information corresponding to the plurality of features associated with the plurality of web APIs based on the constructed initial dataset.

8. The method according to claim 7, wherein the plurality of features comprises an endpoint vector feature, a description vector feature, a Hyper-Text Transfer Protocol (HTTP) method feature, a cosine similarity feature, a spacy similarity feature, a session segment feature, a description tag feature, a number of tokens feature, or a count of endpoint names feature.

9. The method according to claim 7, further comprising:
computing an endpoint vector of each endpoint name in the constructed initial dataset;

computing a description vector of each endpoint description in the constructed initial dataset;
computing a cosine similarity score between each endpoint name in the constructed initial dataset and the computed description vector for a corresponding endpoint description in the constructed initial dataset;
computing a spacy similarity score between each endpoint name in the constructed initial dataset and the corresponding endpoint description; and
generating the training dataset based on the computed endpoint vector, the computed description vector, the computed cosine similarity score, and the computer spacy similarity score.

10. The method according to claim 7, further comprising:
determining a presence of an HTTP method for a corresponding endpoint name in the retrieved documentation corpus;
identifying the HTTP method for the corresponding endpoint name based on the determination that the HTTP method is present for the corresponding endpoint name in the retrieved documentation corpus,
wherein the HTTP method is one of GET, POST, PUT, PATCH, DELETE, OPTIONS, or HEAD, and
wherein the identifying further comprises:
setting the HTTP method as NONE for the corresponding endpoint name based on the determination that the HTTP method is absent for the corresponding endpoint name in the retrieved documentation corpus; and
generating the training dataset based on the identified HTTP method.

11. The method according to claim 7, further comprising:
determining, from the retrieved documentation corpus, a presence of one or more sentences of a corresponding endpoint description for a corresponding endpoint name in a same session as that of the corresponding endpoint name;
setting a session segment value as one based on the determination that the one or more sentences are present in the same session as that of the corresponding endpoint name;
setting the session segment value as zero based on the determination that the one or more sentences are absent in the same session as that of the corresponding endpoint name; and
generating the training dataset based on the set session segment value.

12. The method according to claim 7, further comprising:
determining a presence of an endpoint description tag for a corresponding endpoint name in the retrieved document corpus;
setting a description tag value as zero for the corresponding endpoint name based on the determination that the endpoint description tag is absent for the corresponding endpoint name in the retrieved document corpus;
generating a word-vector representation of the endpoint description tag based on the determination that the endpoint description tag is present for the corresponding endpoint name in the retrieved document corpus;
setting the generated word-vector representation as the description tag value; and
generating the training dataset based on the description tag value.

13. The method according to claim 7, further comprising:
estimating a number of tokens comprising a number of words and a number of special characters from a corresponding endpoint description for a corresponding endpoint name in the constructed initial dataset;
determining a number of occurrences of the corresponding endpoint name in the corresponding endpoint description; and
generating the training dataset based on the estimated number of tokens and the determined number of occurrences of the corresponding endpoint name.

14. The method according to claim 1, wherein the ML model is a multistage neural network-based model comprising an first stage and a second stage,
wherein the first stage comprises a pair of Deep Neural Networks (DNNs) arranged in parallel with an Artificial Neural Network (ANN), and
wherein the second stage comprises a merge layer for merging a pair of first outputs from the pair of DNNs and a second output from the ANN.

15. The method according to claim 14, wherein the obtaining the ML model comprises:
providing a set of endpoint vectors corresponding to an endpoint vector feature of the generated training dataset to a first DNN of the pair of DNNs;
providing a set of description vectors corresponding to a description vector feature of the generated training dataset to a second DNN of the pair of DNNs;
providing a portion of the feature information corresponding to remaining set of features of the generated training dataset to the ANN;
providing the pair of first outputs and the second output to the merge layer; and
executing a training operation on the pair of DNNs and the ANN to obtain the ML model based on the provided set of endpoint vectors, the provided set of description vectors, the provided remaining set of features, the provided pair of first outputs, and the second output.

16. The method according to claim 14, wherein each DNN of the pair of DNNs is one of a Convolutional Neural Network (CNN) or a Long Short-Term Memory (LSTM)-based DNN.

17. The method according to claim 1, further comprising classifying the provided set of inputs as one of the true description or the false description associated with the endpoint based on an ensemble approach that relies on a plurality of votes of the ML model, wherein the ML model comprises a plurality of models trained on different data points of the training dataset.

18. One or more non-transitory computer-readable storage media configured to store instructions that, in response to being executed, cause a prediction system to perform operations, the operations comprising:
extracting, from a labelled repository, a plurality of true endpoint descriptions associated with a plurality of web Application Programming Interfaces (APIs);
retrieving a documentation corpus associated with the plurality of web APIs;
determining a plurality of false endpoint descriptions associated with the plurality of web APIs based on the retrieved documentation corpus and the extracted plurality of true endpoint descriptions;
extracting feature information corresponding to a plurality of features associated with the plurality of web APIs based on the extracted plurality of true endpoint descriptions, the retrieved documentation corpus, and the determined plurality of false endpoint descriptions;
generating a training dataset based on the extracted feature information;

obtaining a machine learning (ML) model based on the generated training dataset;

providing a set of inputs to the ML model, wherein the set of inputs are associated with an endpoint for a specific web API of the plurality of web APIs; and classifying the provided set of inputs as one of a true description or a false description associated with the endpoint based on a prediction result of the ML model for the provided set of inputs;

wherein the determining the plurality of false endpoint descriptions further comprises, identifying, from the retrieved documentation corpus, a plurality of documents associated with a corresponding plurality of web APIs, wherein the documentation corpus comprises a collection of documents associated with a corresponding collection of APIs;

determining a location of an endpoint name in each document of the identified plurality of documents, wherein the endpoint name is for a corresponding endpoint of a corresponding web API of the plurality of web APIs;

retrieving, from each document of the identified plurality of documents, a first set of sentences preceding the determined location of the endpoint name;

retrieving, from each document of the identified plurality of documents, a second set of sentences succeeding the determined location of the endpoint name; and determining, for the corresponding endpoint of the corresponding web API, a number of sentences specified in a corresponding true endpoint description of the extracted plurality of true endpoint descriptions; and wherein the operations further comprising, generating a first set of n-grams from the retrieved first set of sentences and a second set of n-grams from the retrieved second set of sentences, based on the determination that the number of sentences specified in the corresponding true endpoint description is greater than one; and estimating a first set of sentence similarity scores between each n-gram of the generated first set of n-grams and the corresponding true endpoint description.

19. A prediction system, comprising:

a processor configured to:

extract, from a labelled repository, a plurality of true endpoint descriptions associated with a plurality of web Application Programming Interfaces (APIs);

retrieve a documentation corpus associated with the plurality of web APIs;

determining a plurality of false endpoint descriptions associated with the plurality of web APIs based on the retrieved documentation corpus and the extracted plurality of true endpoint descriptions;

extract feature information corresponding to a plurality of features associated with the plurality of web APIs based on the extracted plurality of true endpoint descriptions, the retrieved documentation corpus, and the determined plurality of false endpoint descriptions;

generate a training dataset based on the extracted feature information; and obtain a machine learning (ML) model based on the generated training dataset;

provide a set of inputs to the ML model, wherein the set of inputs are associated with an endpoint for a specific web API of the plurality of web APIs; and classify the provided set of inputs as one of a true description or a false description associated with the endpoint based on a prediction result of the ML model for the provided set of inputs;

wherein the determining the plurality of false endpoint descriptions further comprises, identifying, from the retrieved documentation corpus, a plurality of documents associated with a corresponding plurality of web APIs, wherein the documentation corpus comprises a collection of documents associated with a corresponding collection of APIs;

determining a location of an endpoint name in each document of the identified plurality of documents, wherein the endpoint name is for a corresponding endpoint of a corresponding web API of the plurality of web APIs;

retrieving, from each document of the identified plurality of documents, a first set of sentences preceding the determined location of the endpoint name;

retrieving, from each document of the identified plurality of documents, a second set of sentences succeeding the determined location of the endpoint name; and determining, for the corresponding endpoint of the corresponding web API, a number of sentences specified in a corresponding true endpoint description of the extracted plurality of true endpoint descriptions; and wherein the processor is further configured to, generate a first set of n-grams from the retrieved first set of sentences and a second set of n-grams from the retrieved second set of sentences, based on the determination that the number of sentences specified in the corresponding true endpoint description is greater than one; and estimate a first set of sentence similarity scores between each n-gram of the generated first set of n-grams and the corresponding true endpoint description.

\* \* \* \* \*